United States Patent
Rokosz

(10) Patent No.: US 12,307,472 B2
(45) Date of Patent: *May 20, 2025

(54) SYSTEM AND METHODS FOR GENERATING MARKET PLANNING AREAS

(71) Applicant: Market Planning Areas, LLC, Buffalo Grove, IL (US)

(72) Inventor: Paul Alan Rokosz, Buffalo Grove, IL (US)

(73) Assignee: Market Planning Areas, LLC, Buffalo Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,679

(22) Filed: Nov. 10, 2023

(65) Prior Publication Data

US 2024/0303678 A1     Sep. 12, 2024

Related U.S. Application Data

(63) Continuation of application No. 18/120,259, filed on Mar. 10, 2023, now Pat. No. 11,854,025.

(51) Int. Cl.
   *G06Q 30/02*           (2023.01)
   *G06Q 10/0637*      (2023.01)
   *G06Q 30/0202*      (2023.01)

(52) U.S. Cl.
   CPC ..... *G06Q 30/0202* (2013.01); *G06Q 10/0637* (2013.01)

(58) Field of Classification Search
None
See application file for complete search history.

(56) References Cited

U.S. PATENT DOCUMENTS

| | | | |
|---|---|---|---|
| 7,516,085 B2 | 4/2009 | Bailey | |
| 8,655,708 B2 | 2/2014 | Spagnolo | |
| 9,799,041 B2 | 10/2017 | Karty et al. | |
| 10,339,547 B2 | 7/2019 | Mansour et al. | |
| 11,501,100 B1 | 11/2022 | Geng et al. | |
| 2003/0097295 A1* | 5/2003 | Kiefer | G06Q 10/04 |
| | | | 705/7.29 |
| 2011/0099048 A1* | 4/2011 | Weiss | H04W 4/029 |
| | | | 705/7.34 |
| 2017/0091795 A1* | 3/2017 | Mansour | G06Q 30/0205 |
| 2017/0105032 A1 | 4/2017 | Davis et al. | |

OTHER PUBLICATIONS

Trivedi (Minakshi Trivedi, Regional and Categorical Patterns in Consumer Behavior: Revealing Trends, Journal of Retailing, vol. 87, Issue 1, 2011, pp. 18-30, ISSN 0022-4359, https://doi.org/10.1016/j.jretai.2010.11.002.).*

* cited by examiner

*Primary Examiner* — Matthew D Henry
(74) *Attorney, Agent, or Firm* — Master Key IP, LLP; Justin G. Sanders

(57) ABSTRACT

A market planning system and associated methods are disclosed for dynamically generating an at least one local trade area and/or market planning area for an at least one business location. In at least one embodiment, a central computing system identifies a plurality of block groups proximal to the at least one business location. For each of the identified block groups, the computing system identifies at least one trade anchor located within said block group. The computing system defines a plurality of local trade areas based on the identified block groups and associated trade anchors, and subsequently defines an at least one market planning area based on the local trade areas.

20 Claims, 3 Drawing Sheets

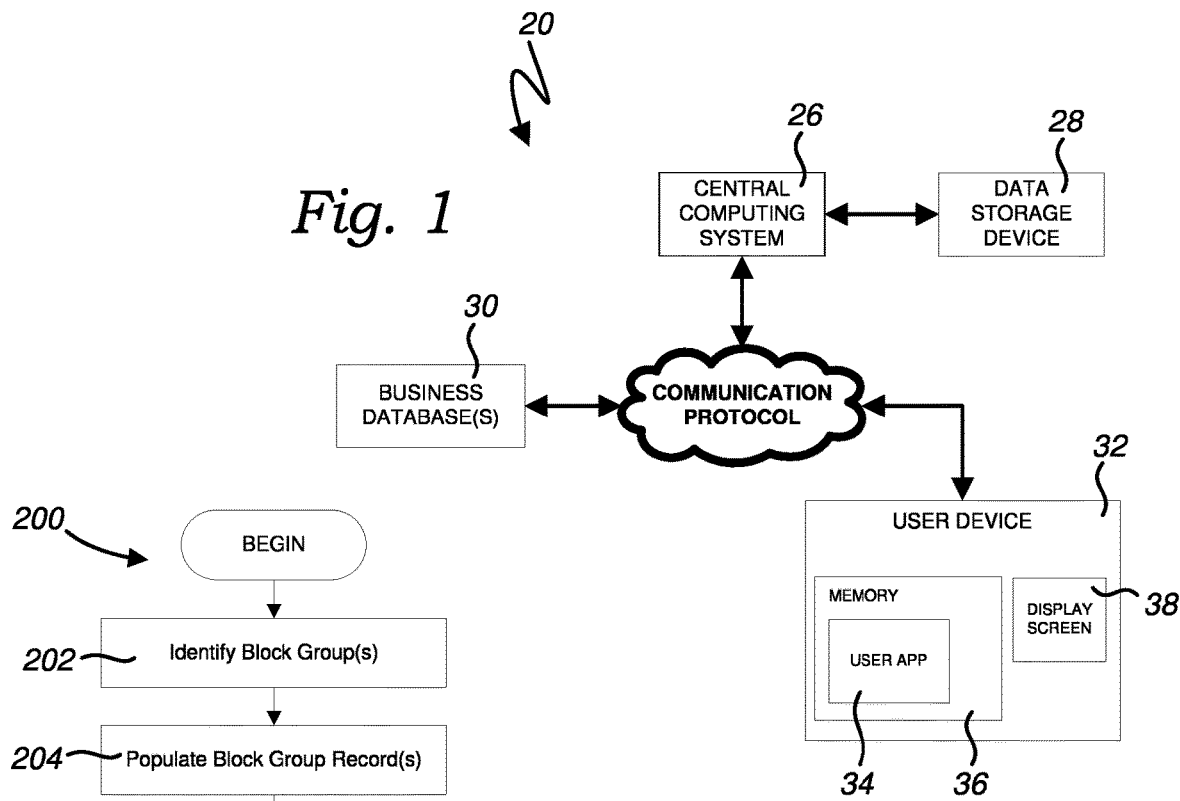

SYSTEM AND METHODS FOR GENERATING MARKET PLANNING AREAS

RELATED APPLICATIONS

This is a continuation application and so claims the benefit pursuant to 35 U.S.C. § 120 of a prior filed and co-pending U.S. non-provisional patent application Ser. No. 18/120,259, filed on Mar. 10, 2023. The contents of the aforementioned application are incorporated herein by reference.

BACKGROUND

The subject of this patent application relates generally to market planning areas, and more particularly to a system and associated methods for dynamically generating local trade areas and market planning areas that are more granular and accurate for a given one or more business locations.

Applicant hereby incorporates herein by reference any and all patents and published patent applications cited or referred to in this application.

By way of background, before setting up a new business, buying an existing business, expanding a business into a new territory, or even launching a new product or service, the potential profitability of the contemplated business location (i.e., the net demand for the products and/or services to be provided by the business in the contemplated business location) should first be determined. Companies (and the market planners they employ) are often interested in information about the people who live or work in the area around a given business location. Furthermore, it is often desirable to create network synergies by operating clusters of business locations in relatively close proximity to one another. These areas (referred to herein as "market areas") typically share homogenous geographic, competitive or demographic conditions. Market areas can be analyzed to reveal competition, market penetration, and growth potential. The information may also be used to generate metrics for measuring productivity and optimizing location coverage within a market area. Targeted marketing and customer profiling may also be done with this information. Traditionally, market planners rely upon one of two sources of information to define the relevant market area for the contemplated business location; though, as discussed further below, neither source of information was designed with market planning or location strategy in mind.

The first source of information is from the U.S. Census Bureau, which provides core-based statistical areas ("CBSA"). A CBSA is a U.S. geographic area defined by the Office of Management and Budget that consists of one or more counties (or equivalents) anchored by an urban center of at least 10,000 people plus adjacent counties that are socioeconomically tied to the urban center by commuting. While these CBSA's are freely available to the public and fairly well-defined based on population parameters, they are nevertheless beholden to county boundaries; and in light of the minimum population rules for defining the CBSA's, some counties (typically more rural counties) do not even fall into a CBSA. Additionally, the entire United States is currently divided into over 900 CBSA's, with the sizes of those CBSA's ranging from about 14,000 to about 19 million people. In other words, these CSBA's tend to have notably inconsistent population sizes.

The other source of information is from The Nielsen Company ("Nielsen"), which provides designated market areas ("DMA"). A DMA is a group of counties and zip codes in the U.S. that form a geographic area in which local television viewing is measured by Nielsen. There are currently about 210 DMA's covering the entire United States, which make them relatively more manageable than CBSA's, but they are not freely available to the public. Additionally, while every county in the U.S. falls within a DMA (unlike the CBSA's noted above), these DMA's are also beholden to county boundaries, along with television station locations; and the sizes of DMA's also range from about 14,000 to about 19 million people.

Thus, both of these sources of information that have traditionally been used by market planners tend to suffer from being rigidly tied to country boundaries and/or television station locations. As a result, these CBSA's and DMA's often fail to accurately define the relevant market area for a given one or more existing or potential business locations. Accordingly, there remains a need for a system and associated methods for dynamically generating local trade areas and market planning areas that are more granular and accurate for a given one or more business locations. Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a market planning system and associated methods for dynamically generating an at least one local trade area and/or market planning area for an at least one business location. In at least one embodiment, a central computing system is configured for receiving and processing select data related to each of the at least one market planning area and business location. The computing system identifies a plurality of block groups proximal to the at least one business location. For each of the identified block groups, the computing system establishes a block group record containing at least one of a unique BG identifier, a census tract corresponding to said block group, BG coordinates containing geographic coordinates of said block group, a BG shapefile containing a polygon representing geographic boundaries of said block group, a population centroid containing geographic coordinates of the population centroid for said block group, a BG population count containing a current estimated population of residents within said block group, and a trade anchor table containing a trade anchor record for each of an at least one trade anchor located within said block group. The computing system identifies at least one trade anchor within said block group. For each of the at least one identified trade anchor, the computing system establishes a trade anchor record containing at least one of a unique anchor identifier, the BG identifier of the corresponding block group for said trade anchor, anchor coordinates containing geographic coordinates of said trade anchor, an anchor type containing a classification type for said trade anchor, and a retailer table containing select details associated with each of an at least one convenience-based retailer located within said trade anchor. The computing system sets the anchor type for a one of the identified trade anchors for said block group to be a primary trade anchor. The computing system defines a plurality of local trade areas based on the identified block groups. For each of the local trade areas, the computing system establishes an LTA record containing at least one of a unique LTA identifier, LTA coordinates containing geographic coordinates of said local trade area, an LTA shapefile containing a polygon representing geographic boundaries of said local trade area, an LTA population count containing a current estimated population of residents within said local trade area, and a block group table containing the block group record for each block group located within said local trade area. The computing system defines an at least one market planning area based on the local trade areas. For each of the at least one market planning area, the computing system establishes an MPA record containing at least one of a unique MPA identifier, MPA coordinates containing geographic coordinates of said market planning area, an MPA shapefile containing a polygon representing geographic boundaries of said market planning area, an MPA population count containing a current estimated population of residents within said market planning area, and an LTA table containing the LTA record for each local trade area located within said market planning area.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 1 is a simplified schematic view of an exemplary market planning system, in accordance with at least one embodiment;

FIG. 2 is a flow diagram of an exemplary method for generating a market planning area, in accordance with at least one embodiment;

Figure 3:
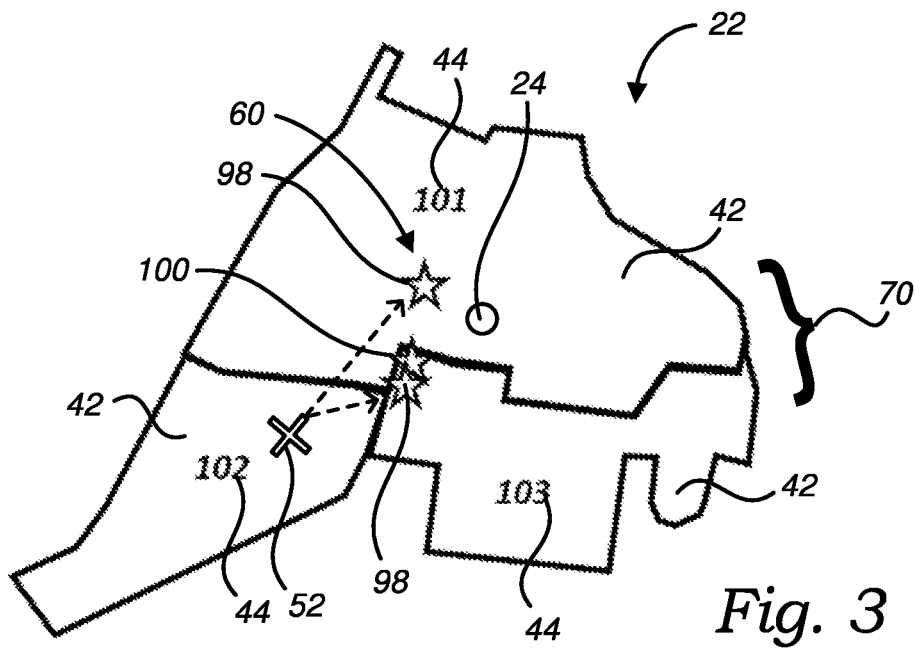
FIG. 3 is an illustration of exemplary block groups, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Turning now to FIG. 1, there is shown a simplified schematic view of an exemplary embodiment of a market planning system 20 configured for dynamically generating an at least one local trade area and/or market planning area for a business location 24. At the outset, it should be noted that the term "business location" as used herein is intended to include not only the geographic locations of active brick-and-mortar (i.e., physical) establishments for a given business, but also potential brick-and-mortar geographic locations where a given business may consider expanding in the future, as well as geographic locations where a given business (either local to or remote from said geographic locations) is engaged in targeted marketing or may engage in targeted marketing in the future with respect to goods and/or services that are provided through brick-and-mortar and/or e-commerce channels to customers in said geographic locations. In at least one further embodiment, the system 20 may be utilized in contexts beyond retail, including but not limited to healthcare, education, industrial, commercial, voting, etc. Thus, the system 20 may be utilized in virtually any situation where physical assets need to be installed in a particular geographic area (i.e., "business location") in order to serve an optimally-sized population. Accordingly, each of these contexts are intended to fall within the scope of the term "business location" as used herein.

In at least one embodiment, the system 20 provides a central computing system 26 configured for receiving and processing select data related to an at least one business location 24 along with the generated at least one market planning area 22 for the at least one business location 24, as discussed further below. In at least one embodiment, the system 20 further provides an at least one data storage device 28 in selective communication with the computing system 26 and configured for storing said data related to each of the at least one market planning area 22 and business location 24. In at least one embodiment, the computing system 26 and data storage device 28 are one and the same—as such, it is intended that those terms as used herein are to be interchangeable with one another. In at least one embodiment, the computing system 26 is also in selective communication with an at least one third-party business database 30—such as Retailsphere, Placer AI, Unacast or AggData, for example—and/or geographic information database—such as Google Maps or another geographic information system ("GIS"), for example—(hereinafter collectively referred to as a "business database 30" for simplicity purposes) containing select data related to the at least one business location 24, as discussed further below. In at least one alternate embodiment, the at least one business database 30 is in the possession and/or control of the system 20 rather than a third party. In at least one such alternate embodiment, the at least one business database 30 is stored on the at least one data storage device 28. In at least one embodiment, an at least one user device 32 is in selective communication with the computing system 26, as discussed further below.

In that regard, it should be noted that communication between each of the computing system 26, data storage device 28, business database 30, and user device 32 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. Similarly, in at least one embodiment, communications between each of the computing system 26, data storage device 28, business database 30, and user device 32 may be encrypted using any encryption method (or combination of methods) now known or later developed. It should also be noted that the terms "computing system" and "user device" are each intended to include any type of computing or electronic device, now known or later developed, capable of substantially carrying out the functionality described herein—such as server computers, desktop computers, mobile phones, smartphones, laptop computers, tablet computers, personal data assistants, gaming devices, wearable devices, etc. As such, the system 20 should not be read as being limited to use with any one particular type of computing or electronic device, even though certain exemplary computing systems and/or user devices may be mentioned or shown herein for illustrative purposes.

In at least one embodiment, the computing system 26 contains the hardware and software necessary to carry out the exemplary methods for dynamically generating the at least one market planning area 22 for a given business location 24, as described herein. Furthermore, in at least one embodiment, the computing system 26 comprises a plurality of computing and/or electronic devices selectively working in concert with one another to carry out the exemplary methods for dynamically generating the at least one market planning area 22 for a given business location 24, as described herein. In at least one embodiment, the at least one user device 32 provides a user application 34 residing locally in memory 36 on the user device 32 (for example, as a standalone application or as a browser extension for an existing Internet browser on the user device 32), the user application 34 being configured for selectively communicating with the computing system 26, as discussed further below. In at least one alternate embodiment, the functionality provided by the user application 34 resides remotely in memory on the computing system 26 and/or data storage device 28, with the at least one user device 32 capable of accessing said functionality via an online portal hosted by (or at least in communication with) the computing system 26 and/or data storage device 28, either in addition to or in lieu of the user application 34 residing locally in memory 36 on the at least one user device 32. It should be noted that the term "memory" is intended to include any type of electronic storage medium (or combination of storage mediums) now known or later developed, such as local hard drives, RAM, flash memory, secure digital ("SD") cards, external storage devices, network or cloud storage devices, integrated circuits, etc. Additionally, in at least one embodiment, each of the at least one user device 32 is in the possession of a user who is desirous of utilizing the system 20 to dynamically generate at least one market planning area 22 for a given business location 24.

It also should be noted that, for simplicity purposes, the functionality provided by the user application 34 will be described herein as such-even though certain embodiments may provide said functionality through an online portal. It should also be noted that, for simplicity purposes, when discussing functionality and the various methods that may be carried out by the system 20 herein, the terms "computing system," "user device" and "user application" are intended to be interchangeable. In that regard, in at least one further embodiment, the computing system 26 and user device 32 are one and the same. With continued reference to FIG. 1, in at least one embodiment, the at least one user device 32 provides an at least one display screen 38 for providing an at least one graphical user interface to assist the associated user in possession of said user device 32 to access and utilize the various functions provided by the system 20.

In at least one embodiment, as illustrated in the flow diagram of FIG. 2, through the user application 34 residing either locally in memory 36 on the at least one user device 32 or remotely on the computing system 26 and/or data storage device 28, the method of dynamically generating at least one market planning area 22 for a given business location 24 entails the steps of the computing system 26 first identifying a block group 40 ("BG") in which the business location 24 is located (202). In at least one alternate embodiment, the methods described herein may be used to generate a plurality of market planning areas 22 for a larger geographic region for multiple business locations 24. In at least one embodiment, as illustrated in FIG. 3, a block group 40 is a geographical unit defined by the United States Census Bureau, and is the smallest geographical unit for which the U.S. Census Bureau publishes sample data. In a bit more detail, in at least one such embodiment, block groups 40 are statistical divisions of census tracts 46, are generally defined to contain between 600 and 3,000 people, and are used to present data and control block numbering. Per U.S. Census Bureau standards, a block group 40 consists of clusters of blocks within the same census tract 46 that have the same first digit of their four-digit census block number. For example, blocks 3001, 3002, 3003, . . . , 3999 in a given census tract 46 are identified as belonging to "block group 3" in that census tract 46. Thus, in at least one such embodiment, each census tract 46 contains at least one block group 40, and block groups 40 are uniquely numbered within the census tract 46. It should be noted that in further embodiments, the geographic boundaries for each block group 40 may be defined based on any other data points now known or later developed, whether set by the U.S. Census Bureau or otherwise. Accordingly, the term "block group" as used herein should not be read as being limited to block groups that are defined by the U.S. Census Bureau. Thus, in further embodiment, any other methods or criteria for defining one or more block groups 40, now known or later developed, may be substituted, so long as the system 20 is capable of substantially carrying out the functionality described herein. In at least one embodiment, the U.S. Census Bureau is an example of one such business database 30 with which the computing system 26 is in select communication, so that the computing system 26 may selectively obtain the necessary block group 40 data for the business location 24—though in further embodiments, other census databases (i.e., local or remote databases containing census-related data) may be accessed and utilized by the system 20, dependent at least in part on the methods and/or criteria used to define the block groups 40. In at least one alternate embodiment, the block group 40 data is instead stored within the data storage device 28.

Figure 4:
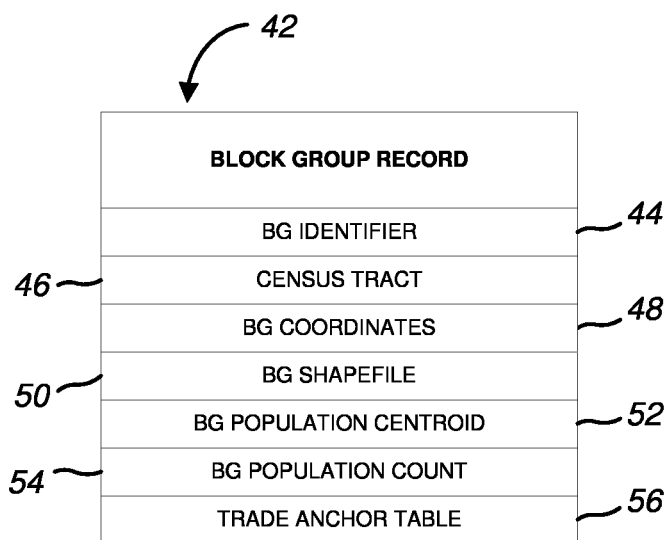
FIG. 4 is an architecture diagram of an exemplary block group record, in accordance with at least one embodiment.

In at least one embodiment, select data associated with each block group 40 identified by the computing system 26 is stored in a corresponding BG record 42 within the data storage device 28 (204). In at least one such embodiment, as illustrated in the architecture diagram of FIG. 4, each BG record 42 contains at least one of a unique BG identifier 44 (either unique as compared to all other block groups 40 in the system 20 or, at the very least, unique as compared to all other block groups 40 in the corresponding census tract 46), the census tract 46 corresponding to the associated block group 40, BG coordinates 48 containing the geographic coordinates of the associated block group 40, a BG shapefile 50 containing a polygon representing the geographic boundaries of the associated block group 40, a population centroid 52 containing the geographic coordinates of the population centroid 52 for the associated block group 40, a BG population count 54 containing the current estimated population of residents within the associated block group 40, and a trade anchor table 56 containing a trade anchor record 58 for each trade anchor 60 located within the associated block group 40, as discussed further below. In that regard, it should be noted that while the term "population" is intended to mean the residents living within the associated geographic region, in at least one further embodiment, "population" may also include individuals who normally purchase goods and/or services within the associated geographic region (even if they don't live within that geographic region as well). Thus, that term as used herein should be read as having either meaning in one or more embodiments. It should also be noted that while the terms "record" and "table" are used herein to describe certain exemplary data structures, in at least one embodiment, any other suitable data type or data structure, or combinations thereof, now known or later developed, capable of storing the appropriate data, may be substituted. Thus, the present invention should not be read as being so limited. It should also be noted that the methods by which the computing system 26 collects the various abovementioned details related to a given block group 40 may involve the use of an application programming interface ("API") installed within the at least one business database 30, or the use of web scraping tools, or any other tool, method or technique now known or later developed.

In at least one embodiment, using data obtained from the at least one business database 30, the computing system 26 identifies one or more trade anchors 60 within the identified block group 40 as well as within one or more adjacent block groups 40 (206). In at least one such embodiment, a trade anchor 60 is a geographic location where convenience-based retailers (e.g., grocery stores, pharmacies, banks, quick-service restaurants, gas stations, auto parts stores, etc.) will typically draw a majority of their business. In other words, trade anchors 60 are geographic areas that facilitate frequent engagement with local residents (i.e., residents who live near the convenience-based retailers) on a regular (most likely weekly) basis. As such, in at least one embodiment, to qualify as a trade anchor 60, the geographic location must contain at least one convenience-based retailer. In at least one further embodiment, to qualify as a trade anchor 60, the geographic location must contain a plurality of convenience-based retailers, with at least one of those convenience-based retailers being a basic needs store (such as a grocery store, for example). In at least one still further embodiment, to qualify as a trade anchor 60, each of the at least one convenience-based retailer in the geographic location must have a square footage that meets or exceeds a pre-defined minimum square footage threshold. In at least one still further embodiment, to qualify as a trade anchor 60, each of the at least one convenience-based retailer in the geographic location must have a quantity of vehicle parking spaces that meets or exceeds a pre-defined minimum parking space quantity threshold. In further embodiments, any other methods or criteria for defining a trade anchor 60, now known or later developed, may be substituted, so long as the system 20 is capable of substantially carrying out the functionality described herein. In at least one such further embodiment, the system 20 allows for a user to selectively designate the type(s) of retailers to be classified as convenience-based retailers, thereby enabling the system 20 to provide more tailored market planning areas 22 for a given user.

Figure 5:
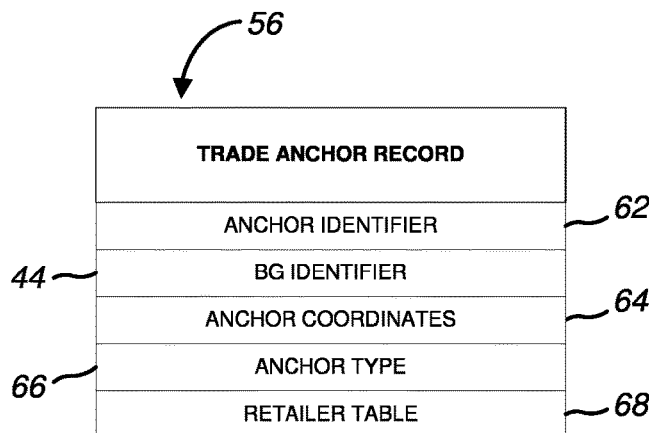
FIG. 5 is an architecture diagram of an exemplary trade anchor record, in accordance with at least one embodiment.

In at least one embodiment, select data associated with each identified trade anchor 60 within a given block group 40 is added as a trade anchor record 58 to the corresponding trade anchor table 56 of the BG record 42 associated with said block group 40 (208). In at least one such embodiment, as illustrated in the architecture diagram of FIG. 5, each trade anchor record 58 contains at least one of a unique anchor identifier 62 (either unique as compared to all other trade anchor records 58 in the system 20 or, at the very least, unique as compared to all other trade anchors 60 in the corresponding block group 40), the BG identifier 44 of the corresponding block group 40 for the associated trade anchor 60, anchor coordinates 64 containing the geographic coordinates of the associated trade anchor 60, an anchor type 66 containing a classification type for the associated trade anchor 60 (e.g., "primary" or "secondary," though other synonymous values or indicators may be substituted) as discussed further below, and a retailer table 68 containing select details associated with each convenience-based retailer located within the associated trade anchor 60, such as a retailer type, a retailer square footage, and a parking space count, for example. In at least one embodiment, if two or more trade anchors 60 within a given block group 40 have anchor coordinates 64 that are within a pre-defined proximity from one another (such as a tenth of a mile, or a quarter of a mile, for example), the computing system 26 may consolidate the data associated with said trade anchors 60 into a single, relatively larger trade anchor record 58.

In at least one embodiment, the computing system 26 determines a primary trade anchor 98 for each block group 40 (210). In at least one such embodiment, the computing system 26 analyzes each of the BG records 42 to determine a quantity of trade anchor records 58 stored in the associated trade anchor table 56 of each BG record 42—i.e., the computing system 26 determines how many trade anchors 60 are located within each of the corresponding block groups 40. In at least one embodiment, any block groups 40 having a population of zero or a population consisting predominantly of institutionalized and/or enlisted residents (i.e., residents who do not currently reside in the block group 40) are disregarded by the computing system 26 or otherwise combined with an adjacent block group 40 having at least one trade anchor 60. In at least one embodiment, where a given block group 40 contains only one trade anchor 60 (such as "block group 101" in FIG. 3, for example), the anchor type 66 associated with said trade anchor 60 is set to "primary." In at least one embodiment, where a given block group 40 contains more than one trade anchor 60 (such as "block group 103" in FIG. 3, for example), the anchor type 66 associated with the trade anchor 60 of the block group 40 having the greatest quantity of convenience-based retailers (based on the data contained in the retailer tables 68 of the associated trade anchor record 58) is set to "primary," and the anchor type 66 associated with each of the other trade anchors 60 in the block group 40 is set to "secondary." In other words, in such embodiments, the computing system 26 gives priority to trade anchors 60 that have relatively higher customer traffic volumes than other trade anchors 60 in the block group 40.

In at least one embodiment, where a given block group 40 contains zero trade anchors 60—referred to herein as an "empty block group"— (such as "block group 102" in FIG. 3, for example), the computing system 26 combines said empty block group 40 with an adjacent block group 40 (or, alternatively, the next nearest block group 40) having a trade anchor 60 that is most convenient for residents living in the empty block group 40. In at least one such embodiment, the computing system 26 identifies a primary trade anchor 98 (i.e., a trade anchor 60 having a "primary" anchor type 66 in the associated trade anchor record 58) in at least one adjacent block group 40 having the shortest travel distance (as compared to all other identified primary trade anchors 98 in any other adjacent block groups 40) —i.e., a travel distance between the anchor coordinates 64 of said primary trade anchor 98 and the population centroid 52 of the empty block group 40. In at least one embodiment, the computing system 26 also identifies a primary trade anchor 98 in at least one adjacent block group 40 having the shortest travel time (as compared to all other identified primary trade anchors 98 in any other adjacent block groups 40) —i.e., a travel time between the anchor coordinates 64 of said primary trade anchor 98 and the population centroid 52 of the empty block group 40. If the same primary trade anchor 98 has both the shortest travel distance as well as the shortest travel time, the computing system 26 combines the empty block group 40 with the block group 40 containing said primary trade anchor 98, with said combined block groups 40 sharing the same primary trade anchor 98. Thus, taking the example illustrated in FIG. 3, the primary trade anchor 98 of "block group 103" has both the shortest travel distance as well as the shortest travel time (depicted by the broken line arrow) to the population centroid 52 of adjacent "block group 102," such that "block group 102" and "block group 103" are then combined by the computing system 26.

In at least one embodiment, where one primary trade anchor 98 has the shortest travel distance to the population centroid 52 of the empty block group 40, and a different primary trade anchor 98 has the shortest travel time to the population centroid 52 of the empty block group 40, the empty block group 40 is categorized by the computing system 26 as being a "marginal" block group 40 (i.e., block groups 40 that could logically be combined with more than one different block group 40, given the conveniently located primary trade anchors 98 in each of those block groups 40), as discussed further below.

In at least one embodiment, where more than one primary trade anchor 98 has the shortest travel time to the population centroid 52 of the empty block group 40, the computing system 26 determines which of said primary trade anchors 98 also has the shortest travel distance to the population centroid 52 of the empty block group 40 (as compared to the other primary trade anchors 98 having the shortest travel time), and the computing system 26 combines the empty block group 40 with the block group 40 containing said primary trade anchor 98, with said combined block groups 40 sharing the same primary trade anchor 98. Similarly, in at least one embodiment, where more than one primary trade anchor 98 has the shortest travel distance to the population centroid 52 of the empty block group 40, the computing system 26 determines which of said primary trade anchors 98 also has the shortest travel time to the population centroid 52 of the empty block group 40 (as compared to the other primary trade anchors 98 having the shortest travel distance), and the computing system 26 combines the empty block group 40 with the block group 40 containing said primary trade anchor 98, with said combined block groups 40 sharing the same primary trade anchor 98. Otherwise, in at least one embodiment, if more than one primary trade anchor 98 has the same travel time and travel distance to the population centroid 52 of the empty block group 40, the empty block group 40 is categorized by the computing system 26 as being a marginal block group 40, as discussed further below.

Figure 6:
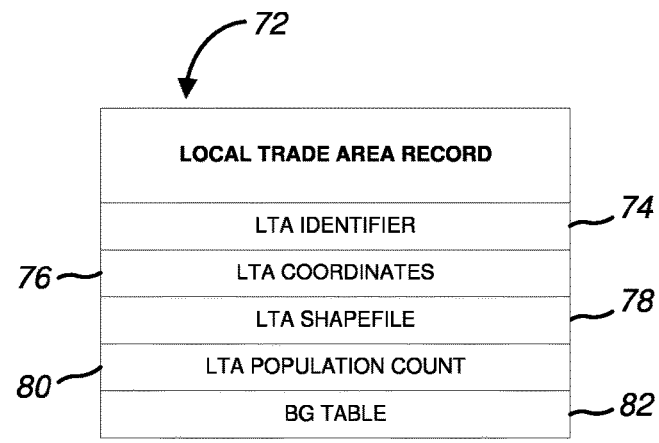
FIG. 6 is an architecture diagram of an exemplary local trade area record, in accordance with at least one embodiment.

In at least one embodiment, the computing system 26 defines an at least one local trade area 70 based on the identified block groups 40 (212). In at least one embodiment, for each block group 40 (other than marginal block groups 40) having a BG population count 54 that is less than a pre-defined minimum population threshold value (such as 7,500 people, for example), if the BG population count 54 of said block group 40 is at least greater than a pre-defined rural population threshold value (such as 3,000 people, for example), and a travel time from the population centroid 52 of said block group 40 to the nearest primary trade anchor 98 of an adjacent block group 40 is greater than a pre-defined rural travel time (such as 30 minutes, for example), the computing system 26 stores said block group 40 as a local trade area 70 ("LTA") within the data storage device 28 (214). In at least on embodiment, select data associated with each identified local trade area 70 is stored in a corresponding LTA record 72 within the data storage device 28. In at least one such embodiment, as illustrated in the architecture diagram of FIG. 6, each LTA record 72 contains at least one of a unique LTA identifier 74 (either unique as compared to all other local trade areas 70 in the system 20 or, at the very least, unique as compared to all other local trade areas 70 in a given geographic region), LTA coordinates 76 containing the geographic coordinates of the associated local trade area 70, an LTA shapefile 78 containing a polygon representing the geographic boundaries of the associated local trade area 70, an LTA population count 80 containing the current estimated population of residents within the associated local trade area 70, and a BG table 82 containing the BG record 42 for each block group 40 located within the associated local trade area 70.

Otherwise, in at least one embodiment, where said block group 40 is adjacent to at least one marginal block group 40, if the combined BG population counts 54 of said block group 40 and at least one marginal block group 40 (with such combined block groups 40 referred to herein as a "potential LTA") is greater than the minimum population threshold value, the computing system 26 stores the potential LTA as a local trade area 70. In at least one embodiment, where the combined BG population counts 54 of the potential LTA is less than the minimum population threshold value, but the potential LTA is adjacent to at least one additional block group 40 having a BG population count 54 that is less than the minimum population threshold value, the computing system 26 adds the at least one additional block group 40 to the potential LTA. These steps are repeated until the block groups 40 of the potential LTA have a combined BG population count 54 that is greater than the minimum population threshold value, at which point the computing system 26 stores the potential LTA as a local trade area 70. In at least one embodiment, where two or more block groups 40 of the local trade area 70 contain a primary trade anchor 98, the primary trade anchor 98 having the greatest quantity of convenience-based retailers (i.e., the primary trade anchor 98 having the highest customer traffic volume as compared to the other primary trade anchors 98 in the local trade area 70) remains a primary trade anchor 98, while any other primary trade anchors 98 in the local trade area 70 are set to be secondary trade anchors 100.

In at least one embodiment, for each block group 40 (other than marginal block groups 40) having a BG population count 54 that is greater than a pre-defined maximum population threshold value (such as 30,000 people, for example), the computing system 26 divides said block group 40 into two or more separate block groups 40 such that each of the separate block groups 40 have a BG population count 54 that is greater than the minimum population threshold value and less than the maximum population threshold value. In at least one such embodiment, the separate block group 40 that contains the primary trade anchor 98 from the original, larger block group 40 is stored as a local trade area 70. As for the at least one other separate block group 40, in at least one embodiment, if the at least one other separate block group 40 contains a secondary trade anchor 100, the secondary trade anchor 100 is converted into a primary trade anchor 98 for said separate block group 40, and said separate block group 40 is stored as a local trade area 70. On the other hand, in at least one embodiment, if the at least one other separate block group 40 does not contain a secondary trade anchor 100 (i.e., if the at least one separate block group 40 is an empty block group 40), said block group 40 is combined with an adjacent block group 40 having a primary trade anchor 98, where the combined BG population count 54 is less than the maximum population threshold value.

In at least one embodiment, for each block group 40 (other than marginal block groups 40) having a BG population count 54 that is greater than the minimum population threshold value and less than the maximum population threshold value, said block group 40 is stored as a local trade area 70. In at least one embodiment, wherein a given local trade area 70 is adjacent to at least one marginal block group 40, if the combined LTA population count 80 and BG population count 54 of the local trade area 70 and at least one marginal block group 40, respectively, is less than the maximum population threshold value, the computing system 26 adds said at least one marginal block group 40 to said local trade area 70. In at least one further embodiment, if the combined LTA population count 80 and BG population count 54 of the local trade area 70 and at least one marginal block group 40, respectively, is greater than the maximum population threshold value, but there are no other adjacent block groups 40 or local trade areas 70 with which to combine said at least one marginal block group 40, the computing system 26 adds said at least one marginal block group 40 to said local trade area 70 and divides said local trade area 70 into two or more separate block groups 40 such that each of the separate block groups 40 has a BG population count 54 that is greater than the minimum population threshold value and less than the maximum population threshold value, in accordance with the steps discussed above.

Figure 7:
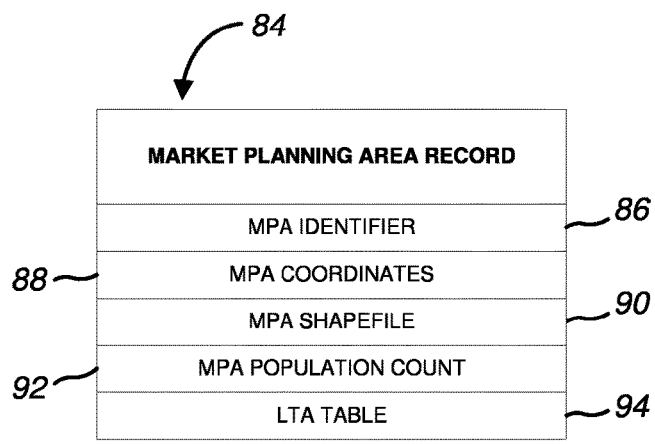
FIG. 7 is an architecture diagram of an exemplary market planning area record, in accordance with at least one embodiment.

In at least one embodiment, with the local trade areas 70 defined and stored in respective LTA records 72, the computing system 26 generates an at least one market planning area 22 ("MPA") comprising one or more of the local trade areas 70 (216). In other words, in at least one embodiment, market planning areas 22 are amalgamations of local trade areas 70 around commercially significant and relatively recognizable focal points that are more proximate to one another than to other local trade areas 70, and thus represent basic "building blocks" for various sub-markets and markets. In at least one embodiment, each market planning area 22 is stored in a corresponding MPA record 84 within the data storage device 28 (218). In at least one such embodiment, as illustrated in the architecture diagram of FIG. 7, each MPA record 84 contains at least one of a unique MPA identifier 86 (either unique as compared to all other market planning areas 22 in the system 20 or, at the very least, unique as compared to all other market planning areas 22 in a given geographic region), MPA coordinates 88 containing the geographic coordinates of the associated market planning area 22, an MPA shapefile 90 containing a polygon representing the geographic boundaries of the associated market planning area 22, an MPA population count 92 containing the current estimated population of residents within the associated market planning area 22, and an LTA table 94 containing the LTA record 72 for each local trade area 70 located within the associated market planning area 22.

In at least one embodiment, the computing system 26 analyzes the LTA records 72 and identifies a pre-defined percentage of associated local trade areas 70 having the greatest number of commercial hub components (i.e., components that help a given local trade area 70 to be a commercial hub in the associated geographic region) and the greatest LTA population counts 80 (such as the top 25% of local trade areas 70, for example), and classifies each of said local trade areas 70 as an MPA anchor. In at least one such embodiment, commercial hub components may include one or more of convenience-based retailers, non-convenience-based retailers, banks and other financial institutions, regional shopping centers, transportation hubs, class A office buildings, government buildings, employment and/or daytime population counts, traffic, land values, and other types of components (now known or later developed) that help a given local trade area to be a commercial hub in the associated geographic region. In at least one embodiment, for each MPA anchor, the computing system 26 generates a corresponding market planning area 22 by combining one or more local trade areas 70 that are adjacent to the MPA anchor. In at least one such embodiment, for each local trade area 70, said local trade area 70 is added to whichever MPA anchor is most convenient for residents living in said local trade area 70. In at least one such embodiment, for each local trade area 70, the computing system 26 determines which MPA anchor has the shortest travel distance (as compared to all other identified MPA anchors) —i.e., a travel distance between the MPA coordinates 88 of said MPA anchor and the anchor coordinates 64 of the primary trade anchor 98 of said local trade area 70. In at least one embodiment, for each local trade area 70, the computing system 26 also determines which MPA anchor has the shortest travel time (as compared to all other identified MPA anchors) —i.e., a travel time between the MPA coordinates 88 of said MPA anchor and the anchor coordinates 64 of the primary trade anchor 98 of said local trade area 70. If the same MPA anchor has both the shortest travel distance as well as the shortest travel time with respect to a given local trade area 70, the computing system 26 adds said local trade area 70 to the market planning area 22 associated with said MPA anchor.

In at least one embodiment, for each local trade area 70, where one MPA anchor has the shortest travel distance to the anchor coordinates 64 of the primary trade anchor 98 of said local trade area 70, and a different MPA anchor has the shortest travel time to the anchor coordinates 64 of the primary trade anchor 98 of said local trade area 70, said local trade area 70 is categorized by the computing system 26 as being a "marginal" LTA (i.e., local trade areas 70 that could logically be added to more than one different market planning area 22, given the conveniently located MPA anchors in each of those market planning areas 22), as discussed further below.

In at least one embodiment, for each local trade area 70, where more than one MPA anchor has the shortest travel time to the anchor coordinates 64 of the primary trade anchor 98 of said local trade area 70, the computing system 26 determines which of said MPA anchors also has the shortest travel distance to the anchor coordinates 64 of the primary trade anchor 98 of said local trade area 70 (as compared to the other MPA anchors having the shortest travel time), and the computing system 26 adds said local trade area 70 to the market planning area 22 associated with said MPA anchor. Similarly, in at least one embodiment, for each local trade area 70, where more than one MPA anchor has the shortest travel distance to the anchor coordinates 64 of the primary trade anchor 98 of said local trade area 70, the computing system 26 determines which of said MPA anchors also has the shortest travel time to the anchor coordinates 64 of the primary trade anchor 98 of said local trade area 70 (as compared to the other MPA anchors having the shortest travel distance), and the computing system 26 adds said local trade area 70 to the market planning area 22 associated with said MPA anchor. Otherwise, in at least one embodiment, if more than one MPA anchor has the same travel time and travel distance to the anchor coordinates 64 of the primary trade anchor 98 of said local trade area 70, said local trade area 70 is categorized by the computing system 26 as being a marginal LTA 70, as discussed further below.

In at least one embodiment, for each market planning area 22 having an MPA population count 92 (i.e., the sum of all LTA population counts 80 associated with the local trade areas 70 that comprise said market planning area 22, with said LTA population counts 80, in turn, being the sum of all BG population counts 54 associated with the block groups 40 that comprise said local trade areas 70) that is less than a pre-defined minimum population threshold value (such as 50,000 people, 100,000 people, or 250,000 people, for example), where said market planning area 22 is adjacent to at least one marginal LTA 70, if the combined MPA population count 92 and LTA population count 80 of the at least one marginal LTA 70 (with such combinations of a market planning area 22 and at least one marginal LTA 70 referred to herein as a "potential MPA") is greater than the minimum population threshold value, the computing system 26 stores the potential MPA as a market planning area 22. In at least one embodiment, where the combined MPA population count 92 of the potential MPA is still less than the minimum population threshold value, the computing system 26 dissolves the potential MPA and incorporates the resulting local trade areas 70 into surrounding market planning areas 22 in accordance with the methods described herein.

In at least one embodiment, for each market planning area 22 having an MPA population count 92 that is greater than a pre-defined maximum population threshold value (such as 1,000,000 people, for example), the computing system 26 divides the local trade areas 70 of said market planning area 22 into two or more separate market planning areas 22 such that each of the separate market planning areas 22 has an MPA population count 92 that is greater than the minimum population threshold value and less than the maximum population threshold value.

In at least one embodiment, for each market planning area 22 having an MPA population count 92 that is greater than the minimum population threshold value and less than the maximum population threshold value, said market planning area 22 is stored as a market planning area 22. In at least one embodiment, wherein a given market planning area 22 is adjacent to at least one marginal LTA 70, if the combined MPA population count 92 and LTA population count 80 of the market planning area 22 and at least one marginal LTA 70, respectively, is less than the maximum population threshold value, the computing system 26 adds said at least one marginal LTA 70 to said market planning area 22. In at least one further embodiment, if the combined MPA population count 92 and LTA population count 80 of the market planning area 22 and at least one marginal LTA 70, respectively, is greater than the maximum population threshold value, but there are no other adjacent local trade areas 70 or market planning areas 22 with which to combine said at least one marginal LTA 70, the computing system 26 adds said at least one marginal LTA 70 to said market planning area 22 and divides said market planning area 22 into two or more separate market planning areas 22 such that each of the separate market planning areas 22 has a MPA population count 92 that is greater than the minimum population threshold value and less than the maximum population threshold value, in accordance with the steps discussed above.

In at least one embodiment, these steps may be repeated at pre-determined intervals (e.g., weekly, monthly, annually, etc.), or upon one or more parameters being automatically or manually modified (e.g., the business location 24, the type(s) of retailers to be classified as convenience-based retailers, the population count for a given block group 40, local trade area 70, or market planning area 22, the minimum or maximum population threshold values, etc.), thereby enabling the system 20 to provide dynamic local trade areas 70 and market planning areas 22 that are tailored for specific businesses or industries. As a result, in at least one embodiment, the system 20 and associated methods described above are capable of generating market planning areas 22 that are more natural and intuitive than prior art CBSA's and DMA's, with geographic areas of greater importance/significance influencing how surrounding "subordinate" geographic areas are grouped into those market planning areas 22.

Aspects of the present specification may also be described as the following embodiments:

1. A method for dynamically generating an at least one market planning area for an at least one business location, the method comprising the steps of: implementing a central computing system configured for receiving and processing select data related to each of the at least one market planning area and business location, the computing system in selective communication with an at least one business database; the computing system identifying a plurality of block groups proximal to the at least one business location; for each of the identified block groups: the computing system establishing a BG record containing at least one of a unique BG identifier, a census tract corresponding to said block group, BG coordinates containing geographic coordinates of said block group, a BG shapefile containing a polygon representing geographic boundaries of said block group, a population centroid containing geographic coordinates of the population centroid for said block group, a BG population count containing a current estimated population of residents within said block group, and a trade anchor table containing a trade anchor record for each of an at least one trade anchor located within said block group; the computing system identifying at least one trade anchor within said block group; for each of the at least one identified trade anchor, the computing system establishing a trade anchor record containing at least one of a unique anchor identifier, the BG identifier of the corresponding block group for said trade anchor, anchor coordinates containing geographic coordinates of said trade anchor, an anchor type containing a classification type for said trade anchor, and a retailer table containing select details associated with each of an at least one convenience-based retailer located within said trade anchor; the computing system setting the anchor type for a one of the identified trade anchors for said block group to be a primary trade anchor; for each of the local trade areas, the computing system establishing an LTA record containing at least one of a unique LTA identifier, LTA coordinates containing geographic coordinates of said local trade area, an LTA shapefile containing a polygon representing geographic boundaries of said local trade area, an LTA population count containing a current estimated population of residents within said local trade area, and a BG table containing the BG record for each block group located within said local trade area; the computing system defining an at least one market planning area based on the local trade areas; and for each of the at least one market planning area, the computing system establishing an MPA record containing at least one of a unique MPA identifier, MPA coordinates containing geographic coordinates of said market planning area, an MPA shapefile containing a polygon representing geographic boundaries of said market planning area, an MPA population count containing a current estimated population of residents within said market planning area, and an LTA table containing the LTA record for each local trade area located within said market planning area.

2. The method according to embodiment 1, further comprising the step of implementing an at least one data storage device in communication with the computing system and configured for selectively storing said data related to each of the at least one market planning area and business location.

3. The method according to embodiments 1-2, wherein the step of the computing system setting the anchor type for a one of the identified trade anchors for said block group to be a primary trade anchor, further comprises the step of the computing system setting the anchor type for any other identified trade anchors for said block group to be a secondary trade anchor.

4. The method according to embodiments 1-3, wherein the step of the computing system identifying at least one trade anchor within said block group further comprises the step of the computing system identifying a geographic location within said block group where one or more convenience-based retailers are located.

5. The method according to embodiments 1-4, wherein the step of the computing system identifying at least one trade anchor within said block group further comprises the step of the computing system identifying a geographic location within said block group where two or more convenience-based retailers are located.

6. The method according to embodiments 1-5, wherein the step of the computing system identifying at least one trade anchor within said block group further comprises the step of the computing system identifying a geographic location within said block group where two or more convenience-based retailers are located, and where at least one of said convenience-based retailers is a basic needs store.

7. The method according to embodiments 1-6, wherein the step of the computing system identifying at least one trade anchor within said block group further comprises the step of the computing system identifying a geographic location within said block group where one or more convenience-based retailers are located, and where each of said convenience-based retailers has a square footage that meets or exceeds a pre-defined minimum square footage threshold.

8. The method according to embodiments 1-7, wherein the step of the computing system identifying at least one trade anchor within said block group further comprises the step of the computing system identifying a geographic location within said block group where one or more convenience-based retailers are located, and where each of said convenience-based retailers has a quantity of vehicle parking spaces that meets or exceeds a pre-defined minimum parking space quantity threshold.

9. The method according to embodiments 1-8, further comprising the step of the computing system consolidating two or more trade anchors into a single trade anchor record upon the computing system determining that said two or more trade anchors have anchor coordinates that are within a pre-defined proximity from one another.

10. The method according to embodiments 1-9, wherein the step of the computing system setting the anchor type for a one of the identified trade anchors for said block group to be a primary trade anchor further comprises the steps of: upon the computing system determining that said block group contains one trade anchor, the computing system setting the anchor type for said trade anchor to be the primary trade anchor; and upon the computing system determining that said block group contains more than one trade anchor, the computing system setting the anchor type of a one of said trade anchors having the relatively greatest quantity of convenience-based retailers located within said trade anchor to be the primary trade anchor.

11. The method according to embodiments 1-10, further comprising the steps of, upon the computing system determining that a given one of the block groups is an empty block group containing zero trade anchors: the computing system identifying an at least one other of the block groups having BG coordinates that are adjacent to the BG coordinates of said empty block group; the computing system determining which of said at least one other of the block groups contains a primary trade anchor having anchor coordinates that are most convenient for residents living in said empty block group; and the computing system combining said empty block group with said other block group containing the primary trade anchor having anchor coordinates that are most convenient for residents living in said empty block group.

12. The method according to embodiments 1-11, wherein the step of the computing system determining which of said at least one other of the block groups contains a primary trade anchor having anchor coordinates that are most convenient for residents living in said empty block group further comprises the steps of: upon the computing system determining that the anchor coordinates of the primary trade anchor of a one of said at least one other of the block groups has both the shortest travel distance as well as the shortest travel time to the population centroid of said empty block group, the computing system combining said empty block group with said other block group containing said primary trade anchor; upon the computing system determining that the anchor coordinates of the primary trade anchor of more than one of said at least one other of the block groups has both the shortest travel distance as well as the shortest travel time to the population centroid of said empty block group, the computing system labeling said empty block group as a marginal block group; and upon the computing system determining that the anchor coordinates of the primary trade anchor of a first one of said at least one other of the block groups has the shortest travel distance to the population centroid of said empty block group, and the anchor coordinates of the primary trade anchor of a second one of said at least one other of the block groups has the shortest travel time to the population centroid of said empty block group, the computing system labeling said empty block group as a marginal block group.

13. The method according to embodiments 1-12, wherein the step of the computing system defining a plurality of local trade areas based on the identified block groups further comprises the steps of, for each block group: upon the computing system determining that said block group has a BG population count that is less than a pre-defined minimum population threshold: upon the computing system determining that the BG population count of said block group is greater than a pre-defined rural population threshold, and upon the computing system further determining that a travel time between the primary centroid of said block group and the anchor coordinates of the primary trade anchor of an adjacent block group is greater than a pre-defined rural travel time, the computing system storing said block group as a local trade area; upon the computing system determining that said block group is adjacent to an at least one marginal block group, and upon the computing system further determining that the combined BG population counts of said block group and at least one marginal block group is greater than the minimum population threshold, the computing system combining and storing said block group and at least one marginal block group as a local trade area; and upon the computing system determining that said block group is adjacent to an at least one marginal block group, and upon the computing system further determining that the combined BG population counts of said block group and at least one marginal block group is less than the minimum population threshold, and upon the computing system further determining that said block group and at least one marginal block group is adjacent to an at least one further block group having a BG population count that is less than the minimum population threshold, the computing system combining and storing said block group, at least one marginal block group and at least one adjacent block group as a local trade area.

14. The method according to embodiments 1-13, wherein the step of the computing system defining a plurality of local trade areas based on the identified block groups further comprises the steps of, for each block group: upon the computing system determining that said block group has a BG population count that is greater than a pre-defined maximum population threshold: the computing system dividing said block group into two or more separate block groups such that each said separate block group has a BG population count that is greater than a pre-defined minimum population threshold and less than the maximum population threshold; the computing system storing a one of said separate block groups containing the primary trade anchor as a local trade area; and for each of the at least one other of said separate block groups not containing the primary trade anchor: upon the computing system determining that said separate block group contains at least one secondary trade anchor: the computing system changing the anchor type of a one of said secondary trade anchors having the relatively greatest quantity of convenience-based retailers as compared to all other of said secondary trade anchors to being a primary trade anchor; and the computing system storing said separate block group as a local trade area; and upon the computing system determining that said separate block group contains no secondary trade anchors, the computing system labeling said separate block group as an empty block group.

15. The method according to embodiments 1-14, wherein the step of the computing system defining a plurality of local trade areas based on the identified block groups further comprises the step of, for each block group, upon the computing system determining that said block group has a BG population count that is greater than a pre-defined minimum population threshold and less than a pre-defined maximum population threshold, the computing system storing said block group as a local trade area.

16. The method according to embodiments 1-15, wherein the step of the computing system defining a plurality of local trade areas based on the identified block groups further comprises the steps of, for each local trade area: upon the computing system determining that said local trade area is adjacent to an at least one marginal block group: upon the computing system determining that the combined LTA and BG population counts of said local trade area and at least one marginal block is less than a pre-defined maximum population threshold, the computing system adding said at least one marginal block group to said local trade area; upon the computing system determining that the combined LTA and BG population counts of said local trade area and at least one marginal block is greater than the maximum population threshold, and upon the computing system further determining that there are no other adjacent block groups or local trade areas with which to combine said at least one marginal block group: the computing system adding said at least one marginal block group to said local trade area; and the computing system dividing said local trade area into two or more separate block groups such that each said separate block group has a BG population count that is greater than a pre-defined minimum population threshold and less than the maximum population threshold.

17. The method according to embodiments 1-16, wherein the step of the computing system defining an at least one local trade area based on the identified block groups further comprises the steps of, for each local trade area: upon the computing system determining that said local trade area contains two or more block groups each having a primary trade anchor: the computing system identifying a one of said primary trade anchors having the relatively greatest quantity of convenience-based retailers as compared to all other of said primary trade anchors; and the computing system changing the anchor type of all other of said primary trade anchors to being secondary trade anchors.

18. The method according to embodiments 1-17, wherein the step of the computing system defining an at least one market planning area based on the local trade areas further comprises the steps of: the computing system identifying a pre-defined percentage of the local trade areas having the relatively greatest quantity of commercial hub components located within said local trade areas, as compared to all other local trade areas; and the computing system storing each of said local trade areas having the relatively greatest quantity of convenience-based retailers as an MPA anchor.

19. The method according to embodiments 1-18, further comprising the steps of, for each local trade area: the computing system adding said local trade area to a one of the MPA anchors that is most convenient for residents living in said local trade area; and the computing system storing the combination of said local trade area and MPA anchor as a market planning area.

20. The method according to embodiments 1-19, wherein the step of adding said local trade area to a one of the MPA anchors that is most convenient for residents living in said local trade area further comprises the steps of: upon the computing system determining that the MPA coordinates of a one of said MPA anchors has both the shortest travel distance as well as the shortest travel time to the anchor coordinates of the primary trade anchor of said local trade area, the computing system adding said local trade area to the market planning area associated with said MPA anchor; upon the computing system determining that the MPA coordinates of more than one of said MPA anchors has the shortest travel distance to the anchor coordinates of the primary trade anchor of said local trade area, the computing system adding said local trade area to the market planning area associated with a one of said MPA anchors having the shortest travel time to the anchor coordinates of the primary trade anchor of said local trade area, as compared to all other of said MPA anchors having the shortest travel distance to the anchor coordinates of the primary trade anchor of said local trade area; upon the computing system determining that the MPA coordinates of more than one of said MPA anchors has the shortest travel time to the anchor coordinates of the primary trade anchor of said local trade area, the computing system adding said local trade area to the market planning area associated with a one of said MPA anchors having the shortest travel distance to the anchor coordinates of the primary trade anchor of said local trade area, as compared to all other of said MPA anchors having the shortest travel time to the anchor coordinates of the primary trade anchor of said local trade area; upon the computing system determining that the MPA coordinates of more than one of said MPA anchors has both the shortest travel distance as well as the shortest travel time to the anchor coordinates of the primary trade anchor of said local trade area, the computing system labeling said local trade area as a marginal LTA; and upon the computing system determining that the MPA coordinates of a first one of said MPA anchors has the shortest travel distance to the anchor coordinates of the primary trade anchor of said local trade area, and the MPA coordinates of a second one of said MPA anchors has the shortest travel time to the anchor coordinates of the primary trade anchor of said local trade area, the computing system labeling said local trade area as a marginal LTA.

21. The method according to embodiments 1-20, wherein the step of the computing system defining an at least one market planning area based on the local trade areas further comprises the steps of, for each market planning area: upon the computing system determining that said market planning area has an MPA population count that is less than a pre-defined minimum population threshold: upon the computing system determining that said market planning area is adjacent to an at least one marginal LTA, and upon the computing system further determining that the combined MPA and LTA population counts of said market planning area and at least one marginal LTA is greater than the minimum population threshold, the computing system adding said at least one marginal LTA to said market planning area; upon the computing system determining that said market planning area is adjacent to an at least one marginal LTA, and upon the computing system further determining that the combined MPA and LTA population counts of said market planning area and at least one marginal LTA is less than the minimum population threshold, the computing system dissolving the market planning area back into the separate local trade areas located within said dissolved market planning area; and upon the computing system determining that said market planning area is not adjacent to an at least one marginal LTA, the computing system dissolving the market planning area back into the separate local trade areas located within said dissolved market planning area.

22. The method according to embodiments 1-21, wherein the step of the computing system defining an at least one market planning area based on the local trade areas further comprises the step of, for each market planning area, upon the computing system determining that said market planning area has an MPA population count that is greater than a pre-defined maximum population threshold, the computing system dividing said market planning area into two or more separate market planning areas such that each said separate market planning area has an MPA population count that is greater than a pre-defined minimum population threshold and less than the maximum population threshold.

23. The method according to embodiments 1-22, wherein the step of the computing system defining an at least one market planning area based on the local trade areas further comprises the step of, for each market planning area, upon the computing system determining that said market planning area has an MPA population count that is greater than a pre-defined minimum population threshold and less than a pre-defined maximum population threshold, the computing system storing said market planning area as a market planning area.

24. The method according to embodiments 1-23, wherein the step of the computing system defining an at least one market planning area based on the local trade areas further comprises the steps of, for each market planning area: upon the computing system determining that said market planning area is adjacent to an at least one marginal LTA: upon the computing system determining that the combined MTA and LTA population counts of said market planning area and at least one marginal LTA is less than a pre-defined maximum population threshold, the computing system adding said at least one marginal LTA to said market planning area; and upon the computing system determining that the combined MTA and LTA population counts of said market planning area and at least one marginal LTA is greater than the maximum population threshold, and upon the computing system further determining that there are no other adjacent local trade areas or market planning areas with which to combine said at least one marginal LTA: the computing system adding said at least one marginal LTA to said market planning area; and the computing system dividing said market planning area into two or more separate market planning areas such that each said separate market planning area has an MPA population count that is greater than a pre-defined minimum population threshold and less than the maximum population threshold.

25. A non-transitory computer readable medium containing program instructions for causing an at least one computing device to perform a method of dynamically generating an at least one market planning area for an at least one business location, the method comprising the steps of: identifying a plurality of block groups proximal to the at least one business location; for each of the identified block groups: establishing a block group record containing at least one of a unique BG identifier, a census tract corresponding to said block group, BG coordinates containing geographic coordinates of said block group, a BG shapefile containing a polygon representing geographic boundaries of said block group, a population centroid containing geographic coordinates of the population centroid for said block group, a BG population count containing a current estimated population of residents within said block group, and a trade anchor table containing a trade anchor record for each of an at least one trade anchor located within said block group; identifying at least one trade anchor within said block group; for each of the at least one identified trade anchor, establishing a trade anchor record containing at least one of a unique anchor identifier, the BG identifier of the corresponding block group for said trade anchor, anchor coordinates containing geographic coordinates of said trade anchor, an anchor type containing a classification type for said trade anchor, and a retailer table containing select details associated with each of an at least one convenience-based retailer located within said trade anchor; setting the anchor type for a one of the identified trade anchors for said block group to be a primary trade anchor; defining a plurality of local trade areas based on the identified block groups; for each of the local trade areas, establishing an LTA record containing at least one of a unique LTA identifier, LTA coordinates containing geographic coordinates of said local trade area, an LTA shapefile containing a polygon representing geographic boundaries of said local trade area, an LTA population count containing a current estimated population of residents within said local trade area, and a block group table containing the block group record for each block group located within said local trade area; defining an at least one market planning area based on the local trade areas; and for each of the at least one market planning area, establishing an MPA record containing at least one of a unique MPA identifier, MPA coordinates containing geographic coordinates of said market planning area, an MPA shapefile containing a polygon representing geographic boundaries of said market planning area, an MPA population count containing a current estimated population of residents within said market planning area, and an LTA table containing the LTA record for each local trade area located within said market planning area.

26. The method according to embodiment 25, wherein the step of the computing system setting the anchor type for a one of the identified trade anchors for said block group to be a primary trade anchor, further comprises the step of the computing system setting the anchor type for any other identified trade anchors for said block group to be a secondary trade anchor.

27. The method according to embodiments 25-26, wherein the step of identifying at least one trade anchor within said block group further comprises the step of identifying a geographic location within said block group where one or more convenience-based retailers are located.

28. The method according to embodiments 25-27, wherein the step of identifying at least one trade anchor within said block group further comprises the step of identifying a geographic location within said block group where two or more convenience-based retailers are located.

29. The method according to embodiments 25-28, wherein the step of identifying at least one trade anchor within said block group further comprises the step of identifying a geographic location within said block group where two or more convenience-based retailers are located, and where at least one of said convenience-based retailers is a basic needs store.

30. The method according to embodiments 25-29, wherein the step of identifying at least one trade anchor within said block group further comprises the step of identifying a geographic location within said block group where one or more convenience-based retailers are located, and where each of said convenience-based retailers has a square footage that meets or exceeds a pre-defined minimum square footage threshold.

31. The method according to embodiments 25-30, wherein the step of identifying at least one trade anchor within said block group further comprises the step of identifying a geographic location within said block group where one or more convenience-based retailers are located, and where each of said convenience-based retailers has a quantity of vehicle parking spaces that meets or exceeds a pre-defined minimum parking space quantity threshold.

32. The method according to embodiments 25-31, further comprising the step of consolidating two or more trade anchors into a single trade anchor record upon determining that said two or more trade anchors have anchor coordinates that are within a pre-defined proximity from one another.

33. The method according to embodiments 25-32, wherein the step of setting the anchor type for a one of the identified trade anchors for said block group to be a primary trade anchor further comprises the steps of: upon determining that said block group contains one trade anchor, setting the anchor type for said trade anchor to be the primary trade anchor; and upon determining that said block group contains more than one trade anchor, setting the anchor type of a one of said trade anchors having the relatively greatest quantity of convenience-based retailers located within said trade anchor to be the primary trade anchor.

34. The method according to embodiments 25-33, further comprising the steps of, upon determining that a given one of the block groups is an empty block group containing zero trade anchors: identifying an at least one other of the block groups having BG coordinates that are adjacent to the BG coordinates of said empty block group; determining which of said at least one other of the block groups contains a primary trade anchor having anchor coordinates that are most convenient for residents living in said empty block group; and combining said empty block group with said other block group containing the primary trade anchor having anchor coordinates that are most convenient for residents living in said empty block group.

35. The method according to embodiments 25-34, wherein the step of determining which of said at least one other of the block groups contains a primary trade anchor having anchor coordinates that are most convenient for residents living in said empty block group further comprises the steps of: upon determining that the anchor coordinates of the primary trade anchor of a one of said at least one other of the block groups has both the shortest travel distance as well as the shortest travel time to the population centroid of said empty block group, combining said empty block group with said other block group containing said primary trade anchor; upon determining that the anchor coordinates of the primary trade anchor of more than one of said at least one other of the block groups has both the shortest travel distance as well as the shortest travel time to the population centroid of said empty block group, labeling said empty block group as a marginal block group; and upon determining that the anchor coordinates of the primary trade anchor of a first one of said at least one other of the block groups has the shortest travel distance to the population centroid of said empty block group, and the anchor coordinates of the primary trade anchor of a second one of said at least one other of the block groups has the shortest travel time to the population centroid of said empty block group, labeling said empty block group as a marginal block group.

36. The method according to embodiments 25-35, wherein the step of defining a plurality of local trade areas based on the identified block groups further comprises the steps of, for each block group: upon determining that said block group has a BG population count that is less than a pre-defined minimum population threshold: upon determining that the BG population count of said block group is greater than a pre-defined rural population threshold, and upon further determining that a travel time between the primary centroid of said block group and the anchor coordinates of the primary trade anchor of an adjacent block group is greater than a pre-defined rural travel time, storing said block group as a local trade area; upon determining that said block group is adjacent to an at least one marginal block group, and upon further determining that the combined BG population counts of said block group and at least one marginal block group is greater than the minimum population threshold, combining and storing said block group and at least one marginal block group as a local trade area; and upon determining that said block group is adjacent to an at least one marginal block group, and upon further determining that the combined BG population counts of said block group and at least one marginal block group is less than the minimum population threshold, and upon further determining that said block group and at least one marginal block group is adjacent to an at least one further block group having a BG population count that is less than the minimum population threshold, combining and storing said block group, at least one marginal block group and at least one adjacent block group as a local trade area.

37. The method according to embodiments 25-36, wherein the step of defining a plurality of local trade areas based on the identified block groups further comprises the steps of, for each block group: upon determining that said block group has a BG population count that is greater than a pre-defined maximum population threshold: dividing said block group into two or more separate block groups such that each said separate block group has a BG population count that is greater than a pre-defined minimum population threshold and less than the maximum population threshold; storing a one of said separate block groups containing the primary trade anchor as a local trade area; and for each of the at least one other of said separate block groups not containing the primary trade anchor: upon determining that said separate block group contains at least one secondary trade anchor: changing the anchor type of a one of said secondary trade anchors having the relatively greatest quantity of convenience-based retailers as compared to all other of said secondary trade anchors to being a primary trade anchor; and storing said separate block group as a local trade area; and upon determining that said separate block group contains no secondary trade anchors, labeling said separate block group as an empty block group.

38. The method according to embodiments 25-37, wherein the step of defining a plurality of local trade areas based on the identified block groups further comprises the step of, for each block group, upon determining that said block group has a BG population count that is greater than a pre-defined minimum population threshold and less than a pre-defined maximum population threshold, storing said block group as a local trade area.

39. The method according to embodiments 25-38, wherein the step of defining a plurality of local trade areas based on the identified block groups further comprises the steps of, for each local trade area: upon determining that said local trade area is adjacent to an at least one marginal block group: upon determining that the combined LTA and BG population counts of said local trade area and at least one marginal block is less than a pre-defined maximum population threshold, adding said at least one marginal block group to said local trade area; upon determining that the combined LTA and BG population counts of said local trade area and at least one marginal block is greater than the maximum population threshold, and upon further determining that there are no other adjacent block groups or local trade areas with which to combine said at least one marginal block group: adding said at least one marginal block group to said local trade area; and dividing said local trade area into two or more separate block groups such that each said separate block group has a BG population count that is greater than a pre-defined minimum population threshold and less than the maximum population threshold.

40. The method according to embodiments 25-39, wherein the step of defining an at least one local trade area based on the identified block groups further comprises the steps of, for each local trade area: upon determining that said local trade area contains two or more block groups each having a primary trade anchor: identifying a one of said primary trade anchors having the relatively greatest quantity of convenience-based retailers as compared to all other of said primary trade anchors; and changing the anchor type of all other of said primary trade anchors to being secondary trade anchors.

41. The method according to embodiments 25-40, wherein the step of defining an at least one market planning area based on the local trade areas further comprises the steps of: identifying a pre-defined percentage of the local trade areas having the relatively greatest quantity of commercial hub components located within said local trade areas, as compared to all other local trade areas; and storing each of said local trade areas having the relatively greatest quantity of convenience-based retailers as an MPA anchor.

42. The method according to embodiments 25-41, further comprising the steps of, for each local trade area: adding said local trade area to a one of the MPA anchors that is most convenient for residents living in said local trade area; and storing the combination of said local trade area and MPA anchor as a market planning area.

43. The method according to embodiments 25-42, wherein the step of adding said local trade area to a one of the MPA anchors that is most convenient for residents living in said local trade area further comprises the steps of: upon determining that the MPA coordinates of a one of said MPA anchors has both the shortest travel distance as well as the shortest travel time to the anchor coordinates of the primary trade anchor of said local trade area, adding said local trade area to the market planning area associated with said MPA anchor; upon determining that the MPA coordinates of more than one of said MPA anchors has the shortest travel distance to the anchor coordinates of the primary trade anchor of said local trade area, adding said local trade area to the market planning area associated with a one of said MPA anchors having the shortest travel time to the anchor coordinates of the primary trade anchor of said local trade area, as compared to all other of said MPA anchors having the shortest travel distance to the anchor coordinates of the primary trade anchor of said local trade area; upon determining that the MPA coordinates of more than one of said MPA anchors has the shortest travel time to the anchor coordinates of the primary trade anchor of said local trade area, adding said local trade area to the market planning area associated with a one of said MPA anchors having the shortest travel distance to the anchor coordinates of the primary trade anchor of said local trade area, as compared to all other of said MPA anchors having the shortest travel time to the anchor coordinates of the primary trade anchor of said local trade area; upon determining that the MPA coordinates of more than one of said MPA anchors has both the shortest travel distance as well as the shortest travel time to the anchor coordinates of the primary trade anchor of said local trade area, labeling said local trade area as a marginal LTA; and upon determining that the MPA coordinates of a first one of said MPA anchors has the shortest travel distance to the anchor coordinates of the primary trade anchor of said local trade area, and the MPA coordinates of a second one of said MPA anchors has the shortest travel time to the anchor coordinates of the primary trade anchor of said local trade area, labeling said local trade area as a marginal LTA.

44. The method according to embodiments 25-43, wherein the step of defining an at least one market planning area based on the local trade areas further comprises the steps of, for each market planning area: upon determining that said market planning area has an MPA population count that is less than a pre-defined minimum population threshold: upon determining that said market planning area is adjacent to an at least one marginal LTA, and upon further determining that the combined MPA and LTA population counts of said market planning area and at least one marginal LTA is greater than the minimum population threshold, adding said at least one marginal LTA to said market planning area; upon determining that said market planning area is adjacent to an at least one marginal LTA, and upon further determining that the combined MPA and LTA population counts of said market planning area and at least one marginal LTA is less than the minimum population threshold, dissolving the market planning area back into the separate local trade areas located within said dissolved market planning area; and upon determining that said market planning area is not adjacent to an at least one marginal LTA, dissolving the market planning area back into the separate local trade areas located within said dissolved market planning area.

45. The method according to embodiments 25-44, wherein the step of defining an at least one market planning area based on the local trade areas further comprises the step of, for each market planning area, upon determining that said market planning area has an MPA population count that is greater than a pre-defined maximum population threshold, dividing said market planning area into two or more separate market planning areas such that each said separate market planning area has an MPA population count that is greater than a pre-defined minimum population threshold and less than the maximum population threshold.

46. The method according to embodiments 25-45, wherein the step of defining an at least one market planning area based on the local trade areas further comprises the step of, for each market planning area, upon determining that said market planning area has an MPA population count that is greater than a pre-defined minimum population threshold and less than a pre-defined maximum population threshold, storing said market planning area as a market planning area.

47. The method according to embodiments 25-46, wherein the step of defining an at least one market planning area based on the local trade areas further comprises the steps of, for each market planning area: upon determining that said market planning area is adjacent to an at least one marginal LTA: upon determining that the combined MTA and LTA population counts of said market planning area and at least one marginal LTA is less than a pre-defined maximum population threshold, adding said at least one marginal LTA to said market planning area; and upon determining that the combined MTA and LTA population counts of said market planning area and at least one marginal LTA is greater than the maximum population threshold, and upon further determining that there are no other adjacent local trade areas or market planning areas with which to combine said at least one marginal LTA: adding said at least one marginal LTA to said market planning area; and dividing said market planning area into two or more separate market planning areas such that each said separate market planning area has an MPA population count that is greater than a pre-defined minimum population threshold and less than the maximum population threshold.

48. A market planning system configured for dynamically generating an at least one market planning area for an at least one business location, the system comprising: a central computing system in selective communication with an at least one business database and configured for: identifying a plurality of block groups proximal to the at least one business location; for each of the identified block groups: establishing a block group record containing at least one of a unique BG identifier, a census tract corresponding to said block group, BG coordinates containing geographic coordinates of said block group, a BG shapefile containing a polygon representing geographic boundaries of said block group, a population centroid containing geographic coordinates of the population centroid for said block group, a BG population count containing a current estimated population of residents within said block group, and a trade anchor table containing a trade anchor record for each of an at least one trade anchor located within said block group; identifying at least one trade anchor within said block group; for each of the at least one identified trade anchor, establishing a trade anchor record containing at least one of a unique anchor identifier, the BG identifier of the corresponding block group for said trade anchor, anchor coordinates containing geographic coordinates of said trade anchor, an anchor type containing a classification type for said trade anchor, and a retailer table containing select details associated with each of an at least one convenience-based retailer located within said trade anchor; setting the anchor type for a one of the identified trade anchors for said block group to be a primary trade anchor; defining a plurality of local trade areas based on the identified block groups; for each of the local trade areas, establishing an LTA record containing at least one of a unique LTA identifier, LTA coordinates containing geographic coordinates of said local trade area, an LTA shapefile containing a polygon representing geographic boundaries of said local trade area, an LTA population count containing a current estimated population of residents within said local trade area, and a block group table containing the block group record for each block group located within said local trade area; defining an at least one market planning area based on the local trade areas; and for each of the at least one market planning area, establishing an MPA record containing at least one of a unique MPA identifier, MPA coordinates containing geographic coordinates of said market planning area, an MPA shapefile containing a polygon representing geographic boundaries of said market planning area, an MPA population count containing a current estimated population of residents within said market planning area, and an LTA table containing the LTA record for each local trade area located within said market planning area.

49. The market planning system according to embodiment 48, further comprising an at least one data storage device in communication with the computing system and configured for selectively storing select data related to each of the at least one market planning area and business location.

50. The market planning system according to embodiments 48-49, wherein while setting the anchor type for a one of the identified trade anchors for said block group to be a primary trade anchor, the computing system is further configured for setting the anchor type for any other identified trade anchors for said block group to be a secondary trade anchor.

51. The market planning system according to embodiments 48-50, wherein while identifying at least one trade anchor within said block group, the computing system is further configured for identifying a geographic location within said block group where one or more convenience-based retailers are located.

52. The market planning system according to embodiments 48-51, wherein while identifying at least one trade anchor within said block group, the computing system is further configured for identifying a geographic location within said block group where two or more convenience-based retailers are located.

53. The market planning system according to embodiments 48-52, wherein while identifying at least one trade anchor within said block group, the computing system is further configured for identifying a geographic location within said block group where two or more convenience-based retailers are located, and where at least one of said convenience-based retailers is a basic needs store.

54. The market planning system according to embodiments 48-53, wherein while identifying at least one trade anchor within said block group, the computing system is further configured for identifying a geographic location within said block group where one or more convenience-based retailers are located, and where each of said convenience-based retailers has a square footage that meets or exceeds a pre-defined minimum square footage threshold.

55. The market planning system according to embodiments 48-54, wherein while identifying at least one trade anchor within said block group, the computing system is further configured for identifying a geographic location within said block group where one or more convenience-based retailers are located, and where each of said convenience-based retailers has a quantity of vehicle parking spaces that meets or exceeds a pre-defined minimum parking space quantity threshold.

56. The market planning system according to embodiments 48-55, wherein the computing system is further configured for consolidating two or more trade anchors into a single trade anchor record upon determining that said two or more trade anchors have anchor coordinates that are within a pre-defined proximity from one another.

57. The market planning system according to embodiments 48-56, wherein while setting the anchor type for a one of the identified trade anchors for said block group to be a primary trade anchor, the computing system is further configured for: upon determining that said block group contains one trade anchor, setting the anchor type for said trade anchor to be the primary trade anchor; and upon determining that said block group contains more than one trade anchor, setting the anchor type of a one of said trade anchors having the relatively greatest quantity of convenience-based retailers located within said trade anchor to be the primary trade anchor.

58. The market planning system according to embodiments 48-57, wherein the computing system is further configured for, upon determining that a given one of the block groups is an empty block group containing zero trade anchors: identifying an at least one other of the block groups having BG coordinates that are adjacent to the BG coordinates of said empty block group; determining which of said at least one other of the block groups contains a primary trade anchor having anchor coordinates that are most convenient for residents living in said empty block group; and combining said empty block group with said other block group containing the primary trade anchor having anchor coordinates that are most convenient for residents living in said empty block group.

59. The market planning system according to embodiments 48-58, wherein while determining which of said at least one other of the block groups contains a primary trade anchor having anchor coordinates that are most convenient for residents living in said empty block group, the computing system is further configured for: upon determining that the anchor coordinates of the primary trade anchor of a one of said at least one other of the block groups has both the shortest travel distance as well as the shortest travel time to the population centroid of said empty block group, combining said empty block group with said other block group containing said primary trade anchor; upon determining that the anchor coordinates of the primary trade anchor of more than one of said at least one other of the block groups has both the shortest travel distance as well as the shortest travel time to the population centroid of said empty block group, labeling said empty block group as a marginal block group; and upon determining that the anchor coordinates of the primary trade anchor of a first one of said at least one other of the block groups has the shortest travel distance to the population centroid of said empty block group, and the anchor coordinates of the primary trade anchor of a second one of said at least one other of the block groups has the shortest travel time to the population centroid of said empty block group, labeling said empty block group as a marginal block group.

60. The market planning system according to embodiments 48-59, wherein while defining a plurality of local trade areas based on the identified block groups, the computing system is further configured for, for each block group: upon determining that said block group has a BG population count that is less than a pre-defined minimum population threshold: upon determining that the BG population count of said block group is greater than a pre-defined rural population threshold, and upon further determining that a travel time between the primary centroid of said block group and the anchor coordinates of the primary trade anchor of an adjacent block group is greater than a pre-defined rural travel time, storing said block group as a local trade area; upon determining that said block group is adjacent to an at least one marginal block group, and upon further determining that the combined BG population counts of said block group and at least one marginal block group is greater than the minimum population threshold, combining and storing said block group and at least one marginal block group as a local trade area; and upon determining that said block group is adjacent to an at least one marginal block group, and upon further determining that the combined BG population counts of said block group and at least one marginal block group is less than the minimum population threshold, and upon further determining that said block group and at least one marginal block group is adjacent to an at least one further block group having a BG population count that is less than the minimum population threshold, combining and storing said block group, at least one marginal block group and at least one adjacent block group as a local trade area.

61. The market planning system according to embodiments 48-60, wherein while defining a plurality of local trade areas based on the identified block groups, the computing system is further configured for, for each block group: upon determining that said block group has a BG population count that is greater than a pre-defined maximum population threshold: dividing said block group into two or more separate block groups such that each said separate block group has a BG population count that is greater than a pre-defined minimum population threshold and less than the maximum population threshold; storing a one of said separate block groups containing the primary trade anchor as a local trade area; and for each of the at least one other of said separate block groups not containing the primary trade anchor:

upon determining that said separate block group contains at least one secondary trade anchor: changing the anchor type of a one of said secondary trade anchors having the relatively greatest quantity of convenience-based retailers as compared to all other of said secondary trade anchors to being a primary trade anchor; and storing said separate block group as a local trade area; and upon determining that said separate block group contains no secondary trade anchors, labeling said separate block group as an empty block group.

62. The market planning system according to embodiments 48-61, wherein while defining a plurality of local trade areas based on the identified block groups, the computing system is further configured for, for each block group, upon determining that said block group has a BG population count that is greater than a pre-defined minimum population threshold and less than a pre-defined maximum population threshold, storing said block group as a local trade area.

63. The market planning system according to embodiments 48-62, wherein while defining a plurality of local trade areas based on the identified block groups, the computing system is further configured for, for each local trade area: upon determining that said local trade area is adjacent to an at least one marginal block group: upon determining that the combined LTA and BG population counts of said local trade area and at least one marginal block is less than a pre-defined maximum population threshold, adding said at least one marginal block group to said local trade area; upon determining that the combined LTA and BG population counts of said local trade area and at least one marginal block is greater than the maximum population threshold, and upon further determining that there are no other adjacent block groups or local trade areas with which to combine said at least one marginal block group: adding said at least one marginal block group to said local trade area; and dividing said local trade area into two or more separate block groups such that each said separate block group has a BG population count that is greater than a pre-defined minimum population threshold and less than the maximum population threshold.

64. The market planning system according to embodiments 48-63, wherein while defining an at least one local trade area based on the identified block groups, the computing system is further configured for, for each local trade area: upon determining that said local trade area contains two or more block groups each having a primary trade anchor: identifying a one of said primary trade anchors having the relatively greatest quantity of convenience-based retailers as compared to all other of said primary trade anchors; and changing the anchor type of all other of said primary trade anchors to being secondary trade anchors.

65. The market planning system according to embodiments 48-64, wherein while defining an at least one market planning area based on the local trade areas, the computing system is further configured for: identifying a pre-defined percentage of the local trade areas having the relatively greatest quantity of commercial hub components located within said local trade areas, as compared to all other local trade areas; and storing each of said local trade areas having the relatively greatest quantity of convenience-based retailers as an MPA anchor.

66. The market planning system according to embodiments 48-65, wherein the computing system is further configured for, for each local trade area: adding said local trade area to a one of the MPA anchors that is most convenient for residents living in said local trade area; and storing the combination of said local trade area and MPA anchor as a market planning area.

67. The market planning system according to embodiments 48-66, wherein while adding said local trade area to a one of the MPA anchors that is most convenient for residents living in said local trade area, the computing system is further configured for: upon determining that the MPA coordinates of a one of said MPA anchors has both the shortest travel distance as well as the shortest travel time to the anchor coordinates of the primary trade anchor of said local trade area, adding said local trade area to the market planning area associated with said MPA anchor; upon determining that the MPA coordinates of more than one of said MPA anchors has the shortest travel distance to the anchor coordinates of the primary trade anchor of said local trade area, adding said local trade area to the market planning area associated with a one of said MPA anchors having the shortest travel time to the anchor coordinates of the primary trade anchor of said local trade area, as compared to all other of said MPA anchors having the shortest travel distance to the anchor coordinates of the primary trade anchor of said local trade area; upon determining that the MPA coordinates of more than one of said MPA anchors has the shortest travel time to the anchor coordinates of the primary trade anchor of said local trade area, adding said local trade area to the market planning area associated with a one of said MPA anchors having the shortest travel distance to the anchor coordinates of the primary trade anchor of said local trade area, as compared to all other of said MPA anchors having the shortest travel time to the anchor coordinates of the primary trade anchor of said local trade area; upon determining that the MPA coordinates of more than one of said MPA anchors has both the shortest travel distance as well as the shortest travel time to the anchor coordinates of the primary trade anchor of said local trade area, labeling said local trade area as a marginal LTA; and upon determining that the MPA coordinates of a first one of said MPA anchors has the shortest travel distance to the anchor coordinates of the primary trade anchor of said local trade area, and the MPA coordinates of a second one of said MPA anchors has the shortest travel time to the anchor coordinates of the primary trade anchor of said local trade area, labeling said local trade area as a marginal LTA.

68. The market planning system according to embodiments 48-67, wherein while defining an at least one market planning area based on the local trade areas, the computing system is further configured for, for each market planning area: upon determining that said market planning area has an MPA population count that is less than a pre-defined minimum population threshold: upon determining that said market planning area is adjacent to an at least one marginal LTA, and upon further determining that the combined MPA and LTA population counts of said market planning area and at least one marginal LTA is greater than the minimum population threshold, adding said at least one marginal LTA to said market planning area; upon determining that said market planning area is adjacent to an at least one marginal LTA, and upon further determining that the combined MPA and LTA population counts of said market planning area and at least one marginal LTA is less than the minimum population threshold, dissolving the market planning area back into the separate local trade areas located within said dissolved market planning area; and upon determining that said market planning area is not adjacent to an at least one marginal LTA, dissolving the market planning area back into the separate local trade areas located within said dissolved market planning area.

69. The market planning system according to embodiments 48-68, wherein while defining an at least one market planning area based on the local trade areas, the computing system is further configured for, for each market planning area, upon determining that said market planning area has an MPA population count that is greater than a pre-defined maximum population threshold, dividing said market planning area into two or more separate market planning areas such that each said separate market planning area has an MPA population count that is greater than a pre-defined minimum population threshold and less than the maximum population threshold.

70. The market planning system according to embodiments 48-69, wherein while defining an at least one market planning area based on the local trade areas, the computing system is further configured for, for each market planning area, upon determining that said market planning area has an MPA population count that is greater than a pre-defined minimum population threshold and less than a pre-defined maximum population threshold, storing said market planning area as a market planning area.

71. The market planning system according to embodiments 48-70, wherein while defining an at least one market planning area based on the local trade areas, the computing system is further configured for, for each market planning area: upon determining that said market planning area is adjacent to an at least one marginal LTA: upon determining that the combined MTA and LTA population counts of said market planning area and at least one marginal LTA is less than a pre-defined maximum population threshold, adding said at least one marginal LTA to said market planning area; and upon determining that the combined MTA and LTA population counts of said market planning area and at least one marginal LTA is greater than the maximum population threshold, and upon further determining that there are no other adjacent local trade areas or market planning areas with which to combine said at least one marginal LTA: adding said at least one marginal LTA to said market planning area; and dividing said market planning area into two or more separate market planning areas such that each said separate market planning area has an MPA population count that is greater than a pre-defined minimum population threshold and less than the maximum population threshold.

In closing, regarding the exemplary embodiments of the present invention as shown and described herein, it will be appreciated that a market planning system is disclosed and configured for dynamically generating local trade areas and market planning areas that are more granular and accurate for a given one or more business locations. Because the principles of the invention may be practiced in a number of configurations beyond those shown and described, it is to be understood that the invention is not in any way limited by the exemplary embodiments, but is generally directed to a market planning system and is able to take numerous forms to do so without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any logic code, programs, modules, processes, and/or methods disclosed herein, along with the order in which the respective elements of any such method are performed, are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived." The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for dynamically generating an at least one market planning area for an at least one business location, the method comprising the steps of:
implementing a central computing system configured for receiving and processing select data related to each of the at least one market planning area and business location, the computing system in selective communication with an at least one business database;
the computing system accessing an at least one census database containing select data associated with a plurality of contiguous block groups that form a larger geographic region within which the at least one business location is geographically positioned;
the computing system identifying a plurality of said block groups stored within the at least one census database that are geographically proximal to the at least one business location;
for each of the identified block groups:
the computing system establishing a block group ("BG") record using data obtained from the at least one census database, said BG record containing at least one of a unique BG identifier, a census tract corresponding to said block group, BG coordinates containing geographic coordinates of said block group, a BG shapefile containing a polygon representing geographic boundaries of said block group based on the BG coordinates, a population centroid containing geographic coordinates of the population centroid for said block group, a BG population count containing a current estimated population of residents within said block group, and a trade anchor table containing a trade anchor record for each of an at least one trade anchor determined by the computing system to be geographically located within said block group;
the computing system accessing at least one business database containing select data associated with a plurality of convenience-based retailers;
the computing system comparing the BG coordinates of said block group against geographic coordinates of said convenience-based retailers stored within the at least one business database to determine whether one or more of said convenience-based retailers are geographically positioned within said block group;
the computing system identifying at least one trade anchor geographically positioned within said block group;
for each of the at least one identified trade anchor, the computing system establishing a trade anchor record using data obtained from the at least one business database, said trade anchor record containing at least one of a unique anchor identifier, the BG identifier of the corresponding block group for said trade anchor, anchor coordinates containing geographic coordinates of said trade anchor, an anchor type containing a classification type for said trade anchor, and a retailer table containing select details associated with each of the at least one convenience-based retailer determined by the computing system to be geographically located within said trade anchor;
the computing system setting the anchor type for a one of the identified trade anchors for said block group to be a primary trade anchor;
the computing system defining a plurality of local trade areas based on the identified block groups;
for each of the local trade areas, the computing system establishing a local trade area ("LTA") record containing at least one of a unique LTA identifier, LTA coordinates containing geographic coordinates of said local trade area, an LTA shapefile containing a polygon representing geographic boundaries of said local trade area based on the combined BG shapefiles of each block group geographically located within said local trade area, an LTA population count containing a current estimated population of residents within said local trade area, and a block group table containing the block group record for each block group geographically located within said local trade area;
the computing system defining an at least one market planning area based on the local trade areas; and
for each of the at least one market planning area, the computing system establishing a market planning area ("MPA") record containing at least one of a unique MPA identifier, MPA coordinates containing geographic coordinates of said market planning area, an MPA shapefile containing a polygon representing geographic boundaries of said market planning area based on the combined LTA shapefiles of each local trade area geographically located within said market planning area, an MPA population count containing a current estimated population of residents within said market planning area, and an LTA table containing the LTA record for each local trade area geographically located within said market planning area.

2. The method of claim 1, further comprising the step of the computing system consolidating two or more trade anchors into a single trade anchor record upon the computing system determining that said two or more trade anchors have anchor coordinates that are within a pre-defined proximity from one another.

3. The method of claim 1, wherein the step of the computing system setting the anchor type for a one of the identified trade anchors for said block group to be a primary trade anchor further comprises the steps of:
upon the computing system determining that said block group contains one trade anchor, the computing system setting the anchor type for said trade anchor to be the primary trade anchor; and
upon the computing system determining that said block group contains more than one trade anchor, the computing system setting the anchor type of a one of said trade anchors having the relatively greatest quantity of convenience-based retailers geographically located within said trade anchor to be the primary trade anchor.

4. The method of claim 1, further comprising the steps of, upon the computing system determining that a given one of the block groups is an empty block group containing zero trade anchors:
the computing system identifying an at least one other of the block groups having BG coordinates that are adjacent to the BG coordinates of said empty block group;
the computing system determining which of said at least one other of the block groups contains a primary trade anchor having anchor coordinates that are most convenient for residents living in said empty block group; and
the computing system combining said empty block group with said other block group containing the primary trade anchor having anchor coordinates that are most convenient for residents living in said empty block group.

5. The method of claim 4, wherein the step of the computing system determining which of said at least one other of the block groups contains a primary trade anchor having anchor coordinates that are most convenient for residents living in said empty block group further comprises the steps of:
   upon the computing system determining that the anchor coordinates of the primary trade anchor of a one of said at least one other of the block groups has both the shortest travel distance as well as the shortest travel time to the population centroid of said empty block group, the computing system combining said empty block group with said other block group containing said primary trade anchor;
   upon the computing system determining that the anchor coordinates of the primary trade anchor of more than one of said at least one other of the block groups has both the shortest travel distance as well as the shortest travel time to the population centroid of said empty block group, the computing system labeling said empty block group as a marginal block group; and
   upon the computing system determining that the anchor coordinates of the primary trade anchor of a first one of said at least one other of the block groups has the shortest travel distance to the population centroid of said empty block group, and the anchor coordinates of the primary trade anchor of a second one of said at least one other of the block groups has the shortest travel time to the population centroid of said empty block group, the computing system labeling said empty block group as a marginal block group.

6. The method of claim 1, wherein the step of the computing system defining a plurality of local trade areas based on the identified block groups further comprises the steps of, for each block group:
   upon the computing system determining that said block group has a BG population count that is less than a pre-defined minimum population threshold:
      upon the computing system determining that the BG population count of said block group is greater than a pre-defined rural population threshold, and upon the computing system further determining that a travel time between the primary centroid of said block group and the anchor coordinates of the primary trade anchor of an adjacent block group is greater than a pre-defined rural travel time, the computing system storing said block group as a local trade area;
      upon the computing system determining that said block group is adjacent to an at least one marginal block group, and upon the computing system further determining that the combined BG population counts of said block group and at least one marginal block group is greater than the minimum population threshold, the computing system combining and storing said block group and at least one marginal block group as a local trade area; and
      upon the computing system determining that said block group is adjacent to an at least one marginal block group, and upon the computing system further determining that the combined BG population counts of said block group and at least one marginal block group is less than the minimum population threshold, and upon the computing system further determining that said block group and at least one marginal block group is adjacent to an at least one further block group having a BG population count that is less than the minimum population threshold, the computing system combining and storing said block group, at least one marginal block group and at least one adjacent block group as a local trade area.

7. The method of claim 1, wherein the step of the computing system setting the anchor type for a one of the identified trade anchors for said block group to be a primary trade anchor, further comprises the step of the computing system setting the anchor type for any other identified trade anchors for said block group to be a secondary trade anchor.

8. The method of claim 7, wherein the step of the computing system defining a plurality of local trade areas based on the identified block groups further comprises the steps of, for each block group:
   upon the computing system determining that said block group has a BG population count that is greater than a pre-defined maximum population threshold:
      the computing system dividing said block group into two or more separate block groups such that each said separate block group has a BG population count that is greater than a pre-defined minimum population threshold and less than the maximum population threshold;
      the computing system storing a one of said separate block groups containing the primary trade anchor as a local trade area; and
      for each of the at least one other of said separate block groups not containing the primary trade anchor:
         upon the computing system determining that said separate block group contains at least one secondary trade anchor:
            the computing system changing the anchor type of a one of said secondary trade anchors having the relatively greatest quantity of convenience-based retailers as compared to all other of said secondary trade anchors to being a primary trade anchor; and
            the computing system storing said separate block group as a local trade area; and
         upon the computing system determining that said separate block group contains no secondary trade anchors, the computing system labeling said separate block group as an empty block group.

9. The method of claim 1, wherein the step of the computing system defining a plurality of local trade areas based on the identified block groups further comprises the step of, for each block group, upon the computing system determining that said block group has a BG population count that is greater than a pre-defined minimum population threshold and less than a pre-defined maximum population threshold, the computing system storing said block group as a local trade area.

10. The method of claim 1, wherein the step of the computing system defining a plurality of local trade areas based on the identified block groups further comprises the steps of, for each local trade area:
   upon the computing system determining that said local trade area is adjacent to an at least one marginal block group:
      upon the computing system determining that the combined LTA and BG population counts of said local trade area and at least one marginal block is less than a pre-defined maximum population threshold, the computing system adding said at least one marginal block group to said local trade area;

upon the computing system determining that the combined LTA and BG population counts of said local trade area and at least one marginal block is greater than the maximum population threshold, and upon the computing system further determining that there are no other adjacent block groups or local trade areas with which to combine said at least one marginal block group:

the computing system adding said at least one marginal block group to said local trade area; and the computing system dividing said local trade area into two or more separate block groups such that each said separate block group has a BG population count that is greater than a pre-defined minimum population threshold and less than the maximum population threshold.

11. The method of claim 7, wherein the step of the computing system defining an at least one local trade area based on the identified block groups further comprises the steps of, for each local trade area:

upon the computing system determining that said local trade area contains two or more block groups each having a primary trade anchor:

the computing system identifying a one of said primary trade anchors having the relatively greatest quantity of convenience-based retailers as compared to all other of said primary trade anchors; and the computing system changing the anchor type of all other of said primary trade anchors to being secondary trade anchors.

12. The method of claim 1, wherein the step of the computing system defining an at least one market planning area based on the local trade areas further comprises the steps of:

the computing system identifying a pre-defined percentage of the local trade areas having the relatively greatest quantity of commercial hub components geographically located within said local trade areas, as compared to all other local trade areas; and the computing system storing each of said local trade areas having the relatively greatest quantity of convenience-based retailers as an MPA anchor.

13. The method of claim 12, further comprising the steps of, for each local trade area:

the computing system adding said local trade area to a one of the MPA anchors that is most convenient for residents living in said local trade area; and the computing system storing the combination of said local trade area and MPA anchor as a market planning area.

14. The method of claim 13, wherein the step of adding said local trade area to a one of the MPA anchors that is most convenient for residents living in said local trade area further comprises the steps of:

upon the computing system determining that the MPA coordinates of a one of said MPA anchors has both the shortest travel distance as well as the shortest travel time to the anchor coordinates of the primary trade anchor of said local trade area, the computing system adding said local trade area to the market planning area associated with said MPA anchor;

upon the computing system determining that the MPA coordinates of more than one of said MPA anchors has the shortest travel distance to the anchor coordinates of the primary trade anchor of said local trade area, the computing system adding said local trade area to the market planning area associated with a one of said MPA anchors having the shortest travel time to the anchor coordinates of the primary trade anchor of said local trade area, as compared to all other of said MPA anchors having the shortest travel distance to the anchor coordinates of the primary trade anchor of said local trade area;

upon the computing system determining that the MPA coordinates of more than one of said MPA anchors has the shortest travel time to the anchor coordinates of the primary trade anchor of said local trade area, the computing system adding said local trade area to the market planning area associated with a one of said MPA anchors having the shortest travel distance to the anchor coordinates of the primary trade anchor of said local trade area, as compared to all other of said MPA anchors having the shortest travel time to the anchor coordinates of the primary trade anchor of said local trade area;

upon the computing system determining that the MPA coordinates of more than one of said MPA anchors has both the shortest travel distance as well as the shortest travel time to the anchor coordinates of the primary trade anchor of said local trade area, the computing system labeling said local trade area as a marginal LTA; and upon the computing system determining that the MPA coordinates of a first one of said MPA anchors has the shortest travel distance to the anchor coordinates of the primary trade anchor of said local trade area, and the MPA coordinates of a second one of said MPA anchors has the shortest travel time to the anchor coordinates of the primary trade anchor of said local trade area, the computing system labeling said local trade area as a marginal LTA.

15. The method of claim 1, wherein the step of the computing system defining an at least one market planning area based on the local trade areas further comprises the steps of, for each market planning area:

upon the computing system determining that said market planning area has an MPA population count that is less than a pre-defined minimum population threshold:

upon the computing system determining that said market planning area is adjacent to an at least one marginal LTA, and upon the computing system further determining that the combined MPA and LTA population counts of said market planning area and at least one marginal LTA is greater than the minimum population threshold, the computing system adding said at least one marginal LTA to said market planning area;

upon the computing system determining that said market planning area is adjacent to an at least one marginal LTA, and upon the computing system further determining that the combined MPA and LTA population counts of said market planning area and at least one marginal LTA is less than the minimum population threshold, the computing system dissolving the market planning area back into the separate local trade areas geographically located within said dissolved market planning area; and upon the computing system determining that said market planning area is not adjacent to an at least one marginal LTA, the computing system dissolving the market planning area back into the separate local trade areas geographically located within said dissolved market planning area.

16. The method of claim 1, wherein the step of the computing system defining an at least one market planning area based on the local trade areas further comprises the step of, for each market planning area, upon the computing system determining that said market planning area has an MPA population count that is greater than a pre-defined maximum population threshold, the computing system dividing said market planning area into two or more separate market planning areas such that each said separate market planning area has an MPA population count that is greater than a pre-defined minimum population threshold and less than the maximum population threshold.

17. The method of claim 1, wherein the step of the computing system defining an at least one market planning area based on the local trade areas further comprises the step of, for each market planning area, upon the computing system determining that said market planning area has an MPA population count that is greater than a pre-defined minimum population threshold and less than a pre-defined maximum population threshold, the computing system storing said market planning area as a market planning area.

18. The method of claim 1, wherein the step of the computing system defining an at least one market planning area based on the local trade areas further comprises the steps of, for each market planning area:
upon the computing system determining that said market planning area is adjacent to an at least one marginal LTA:
upon the computing system determining that the combined MTA and LTA population counts of said market planning area and at least one marginal LTA is less than a pre-defined maximum population threshold, the computing system adding said at least one marginal LTA to said market planning area; and
upon the computing system determining that the combined MTA and LTA population counts of said market planning area and at least one marginal LTA is greater than the maximum population threshold, and upon the computing system further determining that there are no other adjacent local trade areas or market planning areas with which to combine said at least one marginal LTA:
the computing system adding said at least one marginal LTA to said market planning area; and
the computing system dividing said market planning area into two or more separate market planning areas such that each said separate market planning area has an MPA population count that is greater than a pre-defined minimum population threshold and less than the maximum population threshold.

19. A non-transitory computer readable medium containing program instructions for causing an at least one computing device to perform a method of dynamically generating an at least one market planning area for an at least one business location, the method comprising the steps of:
accessing an at least one census database containing select data associated with a plurality of contiguous block groups that form a larger geographic region within which the at least one business location is geographically positioned;
identifying a plurality of said block groups stored within the at least one census database that are geographically proximal to the at least one business location;
for each of the identified block groups:
establishing a block group ("BG") record using data obtained from the at least one census database, said BG record containing at least one of a unique BG identifier, a census tract corresponding to said block group, BG coordinates containing geographic coordinates of said block group, a BG shapefile containing a polygon representing geographic boundaries of said block group based on the BG coordinates, a population centroid containing geographic coordinates of the population centroid for said block group, a BG population count containing a current estimated population of residents within said block group, and a trade anchor table containing a trade anchor record for each of an at least one trade anchor determined to be geographically located within said block group;
accessing an at least one business database containing select data associated with a plurality of convenience-based retailers;
comparing the BG coordinates of said block group against geographic coordinates of said convenience-based retailers stored within the at least one business database to determine whether one or more of said convenience-based retailers are geographically positioned within said block group;
identifying at least one trade anchor geographically positioned within said block group;
for each of the at least one identified trade anchor, establishing a trade anchor record using data obtained from the at least one business database, said trade anchor record containing at least one of a unique anchor identifier, the BG identifier of the corresponding block group for said trade anchor, anchor coordinates containing geographic coordinates of said trade anchor, an anchor type containing a classification type for said trade anchor, and a retailer table containing select details associated with each of the at least one convenience-based retailer determined to be geographically located within said trade anchor;
setting the anchor type for a one of the identified trade anchors for said block group to be a primary trade anchor;
defining a plurality of local trade areas based on the identified block groups;
for each of the local trade areas, establishing a local trade area ("LTA") record containing at least one of a unique LTA identifier, LTA coordinates containing geographic coordinates of said local trade area, an LTA shapefile containing a polygon representing geographic boundaries of said local trade area based on the combined BG shapefiles of each block group geographically located within said local trade area, an LTA population count containing a current estimated population of residents within said local trade area, and a block group table containing the block group record for each block group geographically located within said local trade area;
defining an at least one market planning area based on the local trade areas; and
for each of the at least one market planning area, establishing a market planning area ("MPA") record containing at least one of a unique MPA identifier, MPA coordinates containing geographic coordinates of said market planning area, an MPA shapefile containing a polygon representing geographic boundaries of said market planning area based on the combined LTA shapefiles of each local trade area geographically located within said market planning area, an MPA population count containing a current estimated population of residents within said market planning area, and an LTA table containing the LTA record for each local trade area geographically located within said market planning area.

20. A market planning system configured for dynamically generating an at least one market planning area for an at least one business location, the system comprising:
   a central computing system in selective communication with an at least one business database and configured for:
   accessing an at least one census database containing select data associated with a plurality of contiguous block groups that form a larger geographic region within which the at least one business location is geographically positioned;
   identifying a plurality of said block groups stored within the at least one census database that are geographically proximal to the at least one business location;
   for each of the identified block groups:
   establishing a block group ("BG") record using data obtained from the at least one census database, said BG record containing at least one of a unique BG identifier, a census tract corresponding to said block group, BG coordinates containing geographic coordinates of said block group, a BG shapefile containing a polygon representing geographic boundaries of said block group based on the BG coordinates, a population centroid containing geographic coordinates of the population centroid for said block group, a BG population count containing a current estimated population of residents within said block group, and a trade anchor table containing a trade anchor record for each of an at least one trade anchor determined by the computing system to be geographically located within said block group;
   accessing at least one business database containing select data associated with a plurality of convenience-based retailers;
   comparing the BG coordinates of said block group against geographic coordinates of said convenience-based retailers stored within the at least one business database to determine whether one or more of said convenience-based retailers are geographically positioned within said block group;
   identifying at least one trade anchor geographically positioned within said block group;
   for each of the at least one identified trade anchor, establishing a trade anchor record using data obtained from the at least one business database, said trade anchor record containing at least one of a unique anchor identifier, the BG identifier of the corresponding block group for said trade anchor, anchor coordinates containing geographic coordinates of said trade anchor, an anchor type containing a classification type for said trade anchor, and a retailer table containing select details associated with each of the at least one convenience-based retailer determined by the computing system to be geographically located within said trade anchor;
   setting the anchor type for a one of the identified trade anchors for said block group to be a primary trade anchor;
   defining a plurality of local trade areas based on the identified block groups;
   for each of the local trade areas, establishing a local trade area ("LTA") record containing at least one of a unique LTA identifier, LTA coordinates containing geographic coordinates of said local trade area, an LTA shapefile containing a polygon representing geographic boundaries of said local trade area based on the combined BG shapefiles of each block group geographically located within said local trade area, an LTA population count containing a current estimated population of residents within said local trade area, and a block group table containing the block group record for each block group geographically located within said local trade area;
   defining an at least one market planning area based on the local trade areas; and
   for each of the at least one market planning area, establishing a market planning area ("MPA") record containing at least one of a unique MPA identifier, MPA coordinates containing geographic coordinates of said market planning area, an MPA shapefile containing a polygon representing geographic boundaries of said market planning area based on the combined LTA shapefiles of each local trade area geographically located within said market planning area, an MPA population count containing a current estimated population of residents within said market planning area, and an LTA table containing the LTA record for each local trade area geographically located within said market planning area.

* * * * *